US012624751B1

(12) United States Patent

Buehler

(10) Patent No.: US 12,624,751 B1

(45) Date of Patent: May 12, 2026

(54) TORQUE GENERATION SYSTEM AND METHOD

(71) Applicant: Colorado Research Ventures, LLC, Aurora, CO (US)

(72) Inventor: Erik C. Buehler, Aurora, CO (US)

(73) Assignee: Colorado Research Ventures, LLC, Aurora, CO (US)

( * ) Notice: Subject to any disclaimer, the term of this patent is extended or adjusted under 35 U.S.C. 154(b) by 0 days.

(21) Appl. No.: 19/195,518

(22) Filed: Apr. 30, 2025

(51) Int. Cl.
| | |
|---|---|
| *F16H 37/12* | (2006.01) |
| *B25J 9/12* | (2006.01) |
| *B25J 17/02* | (2006.01) |
| *F16H 1/22* | (2006.01) |

(52) U.S. Cl.
CPC .............. *F16H 37/122* (2013.01); *B25J 9/12* (2013.01); *B25J 9/126* (2013.01); *B25J 17/0241* (2013.01); *F16H 1/22* (2013.01)

(58) Field of Classification Search
CPC .......... B25J 9/12; B25J 9/126; B25J 17/0241; F16H 1/06; F16H 1/22; F16H 37/122
See application file for complete search history.

(56) References Cited

U.S. PATENT DOCUMENTS

| | | | | | |
|---|---|---|---|---|---|
| 3,575,621 | A | * | 4/1971 | Voland ..................... | H02K 7/20 |
| | | | | | 318/8 |
| 5,331,266 | A | * | 7/1994 | Widmann ................. | B25J 9/12 |
| | | | | | 318/8 |
| 5,355,743 | A | * | 10/1994 | Tesar ....................... | B25J 9/126 |
| | | | | | 475/341 |
| 8,622,864 | B2 | | 1/2014 | Fauteux et al. | |
| 9,907,722 | B2 | | 3/2018 | Aguirre-Ollinger et al. | |
| 10,711,847 | B2 | * | 7/2020 | Soncina ............. | F16D 25/0638 |
| 10,919,161 | B2 | | 2/2021 | Smith et al. | |

(Continued)

FOREIGN PATENT DOCUMENTS

| | | |
|---|---|---|
| CN | 111221367 A | 6/2020 |
| CN | 113422478 A | 9/2021 |

(Continued)

OTHER PUBLICATIONS

Chang, Kuo-Tsai, et al. "Design and implementation of a piezo-electric clutch mechanism using piezoelectric buzzers." Sensors and Actuators A: Physical, vol. 141, No. 2, Feb. 15, 2008, pp. 515-522, https://doi.org/10.1016/j.sna.2007.10.018. (Year: 2008).*

(Continued)

*Primary Examiner* — Joseph Brown
(74) *Attorney, Agent, or Firm* — Stephen B. Katsaros; Patent Engineering, LLC

(57) ABSTRACT

A torque generation system and associated method are disclosed. A torque generation system may include a torque generator, transmission mechanism, frictional interface, squeezer plate, output plate, piezoelectric actuator, and controller. The system may transition between a zero-torque condition, where the squeezer plate is disengaged, and a torque generation condition, where the controller activates the actuator to engage the frictional interface between various operational modes, which are implemented as various personalized modes. This engagement allows the input torque generated by the torque generator to be transmitted through the frictional interface to the output plate, producing an output torque.

17 Claims, 15 Drawing Sheets

(56) References Cited

U.S. PATENT DOCUMENTS

| | | | |
|---|---|---|---|
| 11,464,655 B2 | 10/2022 | Evans et al. | |
| 11,628,770 B2 | 4/2023 | Van Stiphout et al. | |
| 2011/0214532 A1 | 9/2011 | Kirchner | |
| 2013/0270053 A1* | 10/2013 | Orita | B25J 19/068 |
| | | | 192/57 |
| 2014/0034432 A1 | 2/2014 | Bull | |
| 2015/0136559 A1 | 5/2015 | Brumberger et al. | |
| 2016/0089780 A1* | 3/2016 | Marttinen | B25J 9/08 |
| | | | 901/23 |
| 2022/0219314 A1 | 7/2022 | Reese | |
| 2022/0296211 A1 | 9/2022 | Saroha et al. | |
| 2023/0265910 A1* | 8/2023 | Boiger | F16H 1/22 |
| | | | 310/75 R |

FOREIGN PATENT DOCUMENTS

| | | | |
|---|---|---|---|
| EP | 3326759 B1 | 5/2018 | |
| EP | 3858556 A1 | 8/2021 | |
| WO | 2013189946 A1 | 12/2013 | |
| WO | 2014032662 A1 | 3/2014 | |
| WO | 2015113165 A1 | 8/2015 | |
| WO | 2019018079 A1 | 1/2019 | |

OTHER PUBLICATIONS

B. Heintz, P. Fauteux, D. Létourneau, F. Michaud and M. Lauria, "Using a Dual Differential Rheological Actuator as a high-performance haptic interface," 2010 IEEE/RSJ International Conference on Intelligent Robots and Systems, Taipei, Taiwan, 2010, pp. 2519-2520, doi: 10.1109/IROS.2010.5653624.

Photonymous Labs. (Dec. 12, 2018). Piezoelectric Actuator Testing: Displacement vs Voltage [Video]. YouTube. https://www.youtube.com/watch?v=vKC99y3fZjA. Retrieved Apr. 3, 2025.

* cited by examiner

200

204b

204c

202

204a

304f

304d

300

304e

302

304c

304a

304b

1100

1200

Memory 1106

Complete Engagement Module 1202

Partial Engagement Module 1204

Selective Engagement Module 1206

Shutdown Module 1208

Torque Generator Operational Module 1210

1600

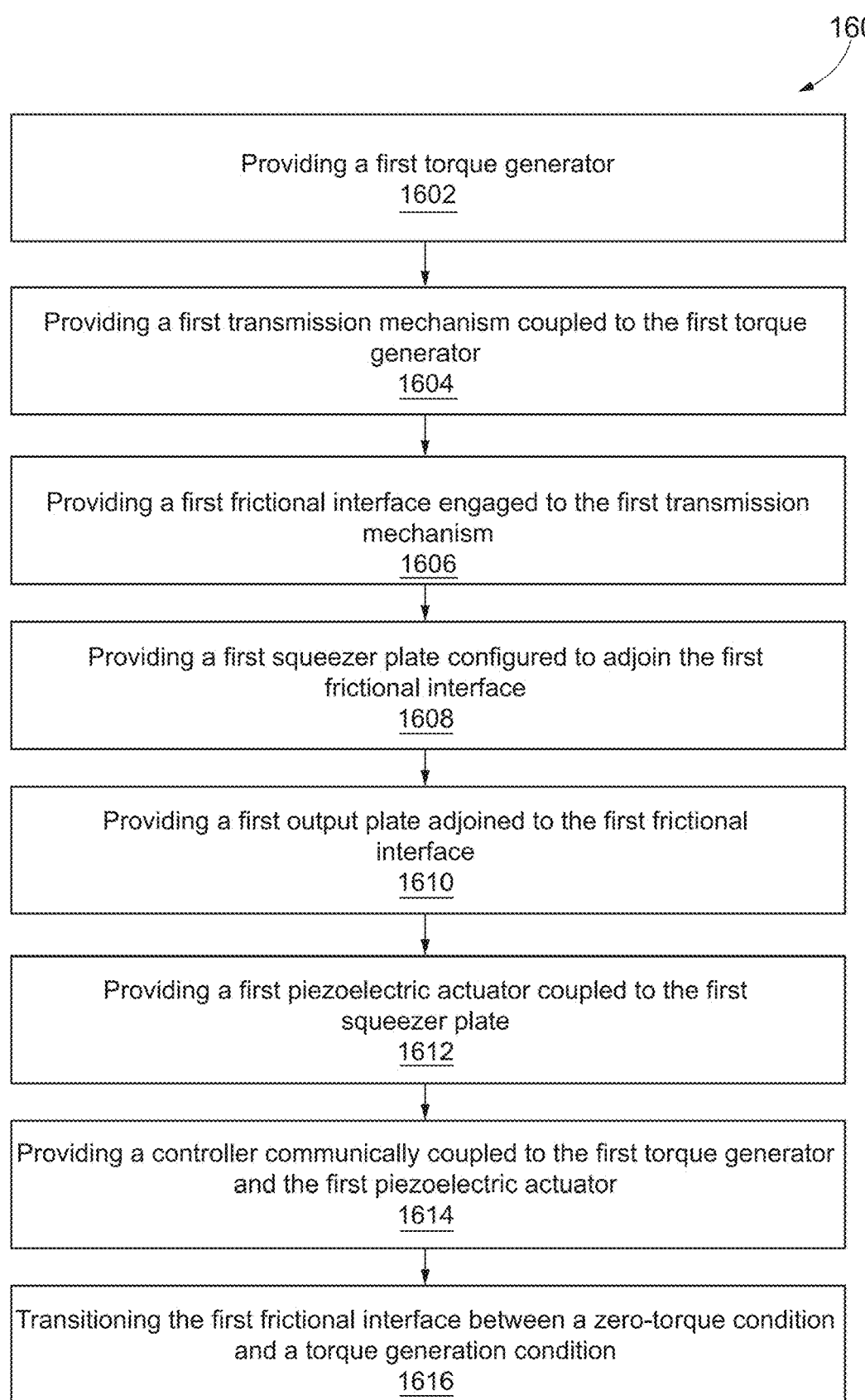

Providing a first torque generator
1602

Providing a first transmission mechanism coupled to the first torque generator
1604

Providing a first frictional interface engaged to the first transmission mechanism
1606

Providing a first squeezer plate configured to adjoin the first frictional interface
1608

Providing a first output plate adjoined to the first frictional interface
1610

Providing a first piezoelectric actuator coupled to the first squeezer plate
1612

Providing a controller communically coupled to the first torque generator and the first piezoelectric actuator
1614

Transitioning the first frictional interface between a zero-torque condition and a torque generation condition
1616

FIG. 16

TORQUE GENERATION SYSTEM AND METHOD

TECHNICAL FIELD

This disclosure pertains, but not by limitation, to the field of torque generation for power transmission in, for example, robotics. More particularly, the disclosure relates to a system and method for generating torque with a plurality of torque inputs in accordance with various operational states and personalized modes.

BACKGROUND

Traditional clutch systems use mechanical, hydraulic, or electromagnetic actuation, often causing delays, inefficiencies, and excessive energy consumption. Further, traditional clutches operate on fixed or limited personal profiles. For example, an actuator may be optimized as a pure torque source for one application, while another may prioritize stiffness modulation or damping characteristics. In systems requiring multiple modes of operation, engineers often resort to using multiple actuators or complex mechanical linkages, thereby adding weight, increasing costs, and complicating controls. This compartmentalized approach hinders versatility and limits the ability of systems to adapt dynamically to changing operational conditions in real-time, hence limiting their effectiveness in high-speed robotic applications.

SUMMARY

A torque generation system and associated method are disclosed. A torque generation system may include a torque generator, transmission mechanism, frictional interface, squeezer plate, output plate, piezoelectric actuator, and controller. The system may transition between a zero-torque condition, where the squeezer plate is disengaged, and a torque generation condition, where the controller activates the actuator to engage the frictional interface. This engagement allows the input torque generated by the torque generator to be transmitted through the frictional interface to the output plate, producing an output torque. The system enables controlled torque transfer by dynamically adjusting engagement through the piezoelectric actuator in response to controller signals. The torque generation system and method are disclosed in detail hereinafter.

A torque generation system is disclosed. The system may include a first torque generator and a first transmission mechanism operatively coupled to the first torque generator. The system may further include a first frictional interface engaged with the first transmission mechanism and a first squeezer plate configured to adjoin the first frictional interface. Additionally, the system may include a first output plate adjoined to the first frictional interface and a first piezoelectric actuator coupled to the first squeezer plate. A controller may be communicatively coupled to both the first torque generator and the first piezoelectric actuator. The system may include a zero-torque condition in which the first squeezer plate is disengaged from the first frictional interface. The system may also include a torque generation condition, wherein the controller may generate an engagement signal to the first piezoelectric actuator. In response to the engagement signal, the first piezoelectric actuator may be actuated to apply a first force on the first squeezer plate, which may cause the first squeezer plate to engage with the first frictional interface. In this state, the first torque generator may generate a first input torque in a first torque direction, and the first input torque may be transmitted to the first output plate as a first output torque via the first frictional interface.

In an illustrative configuration, a torque generation method for generating torque from one or more input torques is disclosed. The method may include providing a first torque generator and a first transmission mechanism operatively coupled to the torque generator. The method may further include providing a first frictional interface engaged with the transmission mechanism and a first squeezer plate configured to interface with the frictional interface. Additionally, the method may include providing a first output plate adjoined to the frictional interface and a first piezoelectric actuator coupled to the squeezer plate. A controller may be communicatively coupled to both the torque generator and the piezoelectric actuator. The method may include transitioning the frictional interface between a zero-torque condition, in which the squeezer plate and the output plate are disengaged from the frictional interface, and a torque generation condition. In the torque generation condition, the controller may generate an engagement signal to the piezoelectric actuator, which, in response, may actuate to apply a force on the squeezer plate. This force may cause the squeezer plate to engage with the frictional interface, allowing the first torque generator to produce an input torque in a specified direction. The input torque may then be transmitted through the frictional interface to the output plate, generating an output torque.

In an illustrative configuration, a torque generation system is disclosed. The torque generation system may include a first torque generator, a first transmission mechanism coupled to the first torque generator, a first frictional interface engaged to the first transmission mechanism, a first squeezer plate configured to adjoin the first frictional interface, a first output plate adjoined to the first frictional interface, a first piezoelectric actuator coupled to the first squeezer plate, and a controller communicably coupled to the first torque generator and the first piezoelectric actuator. The system includes a partially engaged state, wherein the controller transmits a partial engagement signal to the first piezoelectric actuator, and in response to the partial engagement signal, the first piezoelectric actuator is actuated to partially adjoin the first squeezer plate to the first frictional interface. In this state, the first torque generator generates a first input torque in a first torque direction, and the first input torque is transmitted to the first output plate as a first output torque via the first frictional interface. The system further includes a completely engaged state, wherein the controller transmits a complete engagement signal to the first piezoelectric actuator, and in response to the complete engagement signal, the first piezoelectric actuator is actuated to completely adjoin the first squeezer plate to the first frictional interface. In the completely engaged state, the first torque generator generates a first input torque in the first torque direction, and the first input torque is transmitted to the first output plate as a first output torque via the first frictional interface.

In an illustrative configuration, the first piezoelectric actuator is actuated to adjoin partially, or completely, the first squeezer plate to the first frictional interface based on one or more real-time personalized modes, the one or more real-time personalized modes comprising at least one of: a gravity compensation personalized mode; a haptic feedback personalized mode; a torque control personalized mode; a low-power holding personalized mode; an emergency shutdown personalized mode; speed matching personalized mode; a conventional actuation personalized mode; and a torque amplification personalized mode.

In an illustrative configuration, a torque generation system further comprises: a second torque generator; a second transmission mechanism coupled to the second torque generator; a second frictional interface engaged to the second transmission mechanism; a second squeezer plate adjoined to the second frictional interface; a second output plate adjoined to the second frictional interface; a link connecting the first output plate and the second output plate; a second piezoelectric actuator coupled to the second squeezer plate; and a controller communicably coupled to the second torque generator and the second piezoelectric actuator. The system further comprises a partially engaged state, wherein the controller transmits a partial engagement signal to the second piezoelectric actuator; in response to the partial engagement signal, the second piezoelectric actuator is actuated to partially adjoin the second squeezer plate to the second frictional interface; the second torque generator generates a second input torque in a second torque direction; and the second input torque is transmitted to the second output plate as a second output torque via the second frictional interface. The system also comprises a completely engaged state, wherein the controller transmits a complete engagement signal to the second piezoelectric actuator; in response to the complete engagement signal, the second piezoelectric actuator is actuated to completely adjoin the second squeezer plate to the second frictional interface; the second torque generator generates a second input torque in a second torque direction; and the second input torque is transmitted to the second output plate as a second output torque via the second frictional interface; and the second output plate and the first output plate collectively generate an output torque with the first output torque and the second output torque.

In an illustrative configuration, the second piezoelectric actuator is actuated to adjoin partially, or completely, the second squeezer plate to the second frictional interface based on one or more real-time personalized modes, the one or more real-time personalized modes comprising at least one of: a gravity compensation personalized mode; a haptic feedback personalized mode; a torque control personalized mode; a low-power holding personalized mode; an emergency shutdown personalized mode; speed matching personalized mode; a conventional actuation personalized mode; and a torque amplification personalized mode.

Further areas of applicability of the present disclosure will become apparent from the detailed description provided hereinafter. It should be understood that the detailed description and specific examples, while indicating various configurations, are intended for illustration only and are not intended to necessarily limit the scope of the disclosure.

BRIEF DESCRIPTION OF THE DRAWINGS

The accompanying figures of the drawing, which are included to provide a further understanding of general aspects of the system/method, are incorporated in and constitute a part of this specification. These illustrative aspects of the system/method, together with the detailed description, explain the principles of the system. No attempt is made to show structural details in more detail than necessary for a fundamental understanding of the system and the various ways it is practiced. The following figures of the drawing include:

FIG. 16 illustrates a flow chart of a torque generation method.

Similar components and/or features may have the same reference label in the appended figures. Further, various components of the same type may be distinguished by following the reference label with a dash and a second label that distinguishes among the similar components. If only the first reference label is used in the specification, the description applies to any similar components with the same first reference label, irrespective of the second reference label. Where the reference label is used in the specification, the description applies to any similar components with the same reference label.

DETAILED DESCRIPTION

Illustrative configurations are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed configurations. The following detailed description is intended to be considered exemplary only, with the true scope and spirit indicated by the following claims.

The ability to quickly and accurately control torque transmission in robotic systems is crucial for optimizing motion dynamics, reducing wear, and enhancing overall system efficiency. Conventional clutch designs may suffer from slow response times, excessive energy consumption, and limited adaptability to real-time operational changes. These challenges are especially pronounced in high-speed robotic manipulators, autonomous vehicles, and exoskeleton systems, where precise and near-instantaneous clutch engagement is essential for smooth operation and control.

The present disclosure relates to a torque generation system and method to ensure smooth operation and control. The torque generation system may include piezoelectric actuation into a multi-plate clutch assembly for precise force application, rapid response, and low power consumption. The torque generation system may include counter-rotating torque inputs and may be configured to generate a consistent output torque while minimizing drivetrain effects, such as backlash and reflected inertia. The torque generation system may include a piezoelectric actuator that expands or contracts upon changes in electrical input, enabling near-instantaneous clutch engagement. Real-time sensor feedback optimizes performance by adjusting force based on angular position, torque, and temperature. The torque generation system is ideal for high-precision robotics, aerospace, and motion control applications, offering enhanced efficiency, responsiveness, and reliability. The system and method for torque generation are described in detail in conjunction with FIGS. 1-16.

Figure 1:
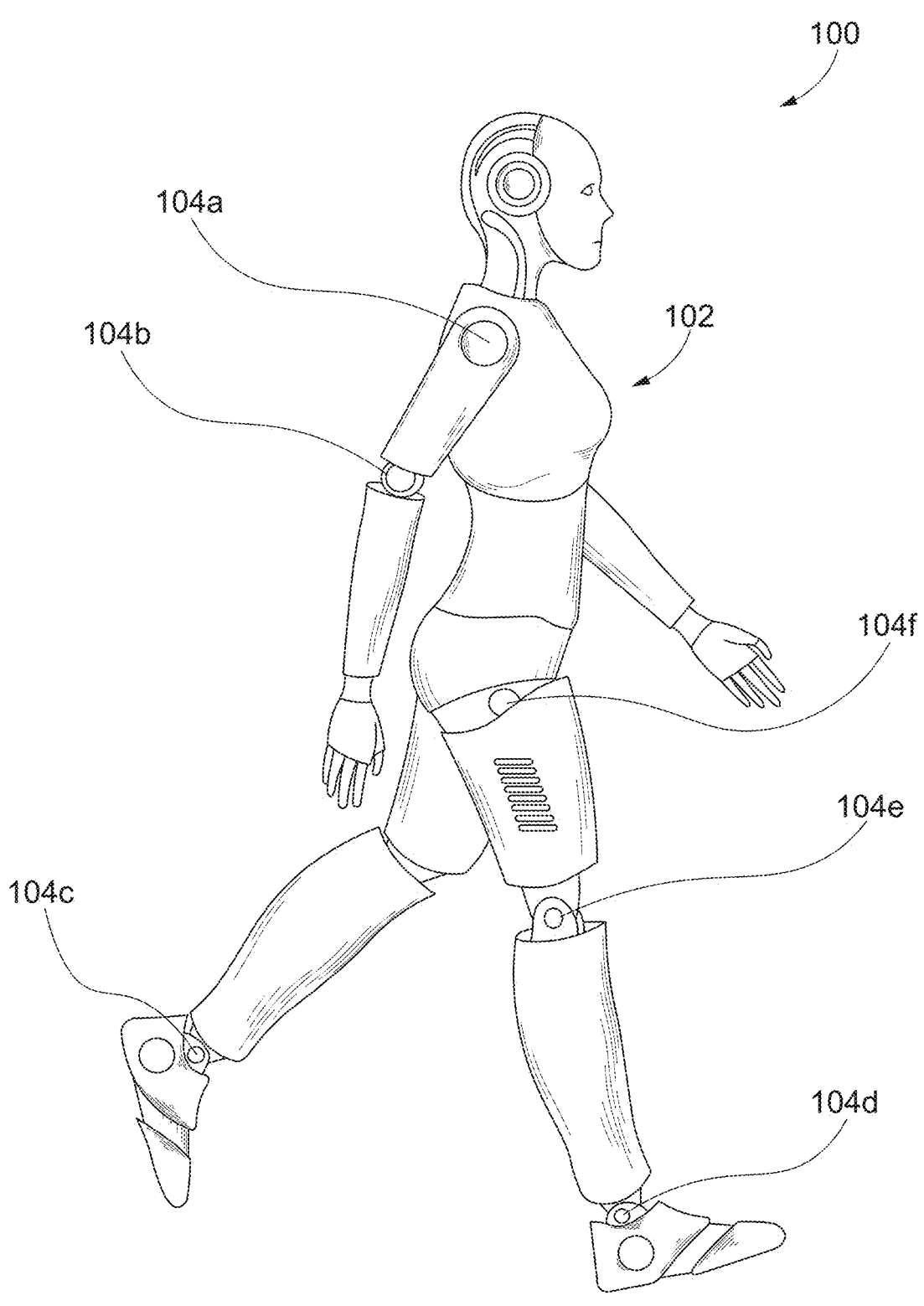
FIG. 1 illustrates a schematic of a humanoid robot.

FIG. 1 illustrates a schematic 100 of a humanoid robot 102. The humanoid robot features multiple articulated joints 104a, 104b 104c, 104d, 104e, 104f (hereinafter articulated joints 104), each driven by a torque generation system, which may include a multi-plate clutch pack actuated by a piezoelectric actuator. Such clutches enable precise torque modulation from the torque generation system at each of the articulated joints 104, allowing the humanoid robot 102 to perform delicate manipulations and human-like motions. Integrating the multi-plate clutch system in the torque generation system ensures smooth movement, eliminating undesired drivetrain effects such as backlash and compliance.

Figure 2:
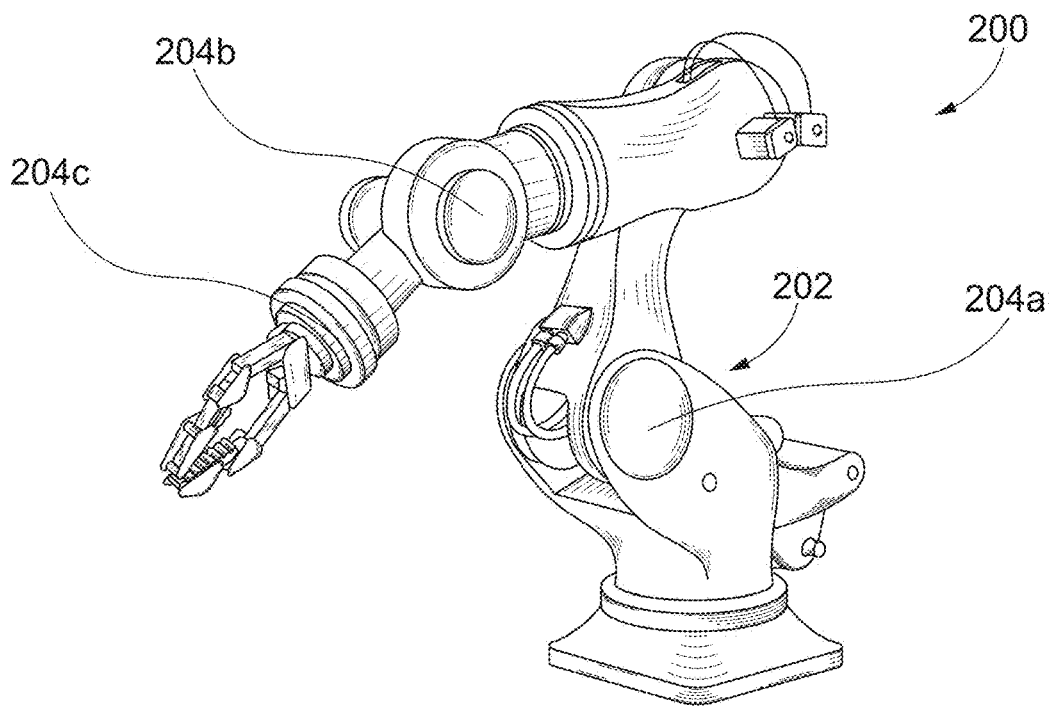
FIG. 2 illustrates a schematic of an industrial 6-axis robotic arm.

FIG. 2 illustrates a schematic 200 of an industrial 6-axis robotic arm 202. The 6-axis robotic arm 202 may include a plurality of mobility joints 204a, 204b, and 204c (hereinafter referred to as mobility joints 204). Each of the mobility joints 204 may be equipped with the torque generation system. The torque generation system enhances precision in pick-and-place operations, welding, and assembly tasks. The torque generation system ensures consistent torque delivery, regardless of variations in payload weight or external forces. The system continuously optimizes performance by utilizing efficient control, reducing energy consumption and mechanical wear. The high-speed response of the clutch system in the torque generation system allows for improved cycle times in automated manufacturing environments, increasing productivity and operational efficiency.

Figure 3:
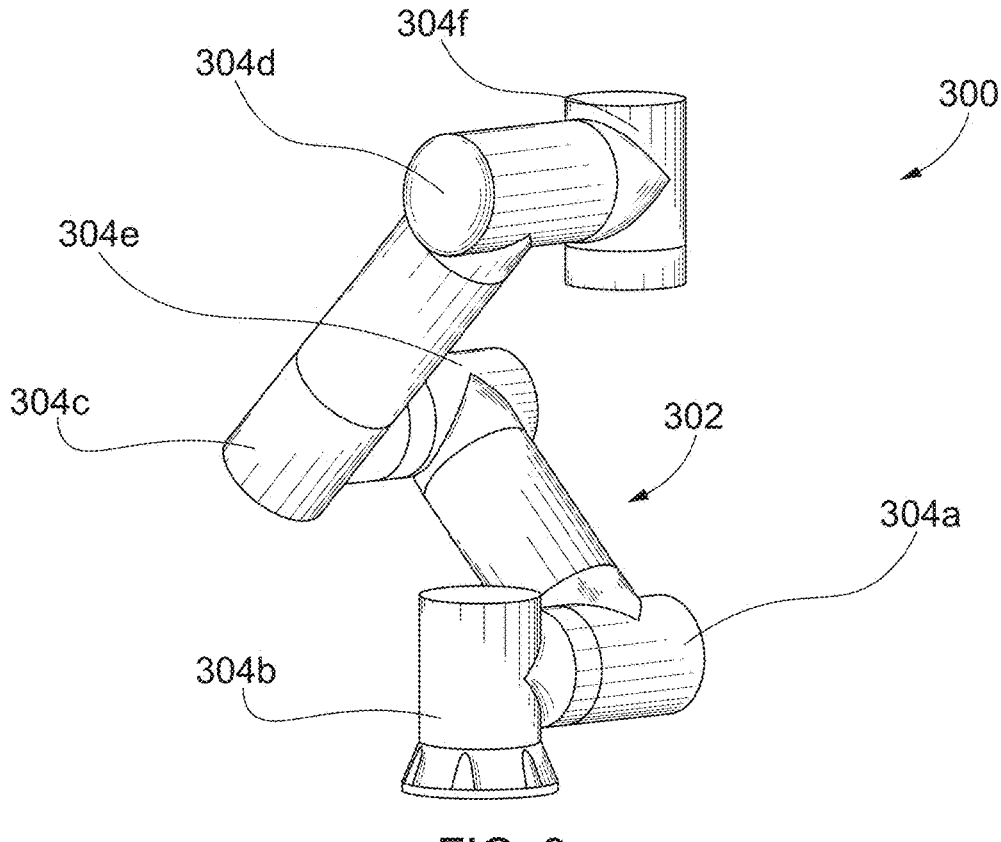
FIG. 3 illustrates a schematic of a standalone robotic arm.

FIG. 3 illustrates a schematic 300 of a standalone robotic arm 302. The standalone robotic arm is designed for high-precision applications such as surgical robotics, laboratory automation, and micro-assembly. The standalone robotic arm 302 may also include a plurality of mobility joints 304a, 304b, 304c, 304d, 304e, and 304f (hereinafter mobility joints 304). Each of the hereinafter mobility joints 304 may be equipped with the torque generation system, which provides precise force application with minimal power consumption, high force sensitivity, and rapid actuation response.

The torque generation system in FIGS. 1-3 uses a clutch system that includes a multi-plate clutch pack actuated by a piezoelectric actuator. The multi-plate clutch pack consists of alternating friction and metal plates arranged in a stack. Upon receiving voltage as an input, the piezoelectric actuator expands or contracts, generating a force that engages the clutch plates and generates an output torque. The torque generation system is explained in detail hereinafter.

Figure 4:
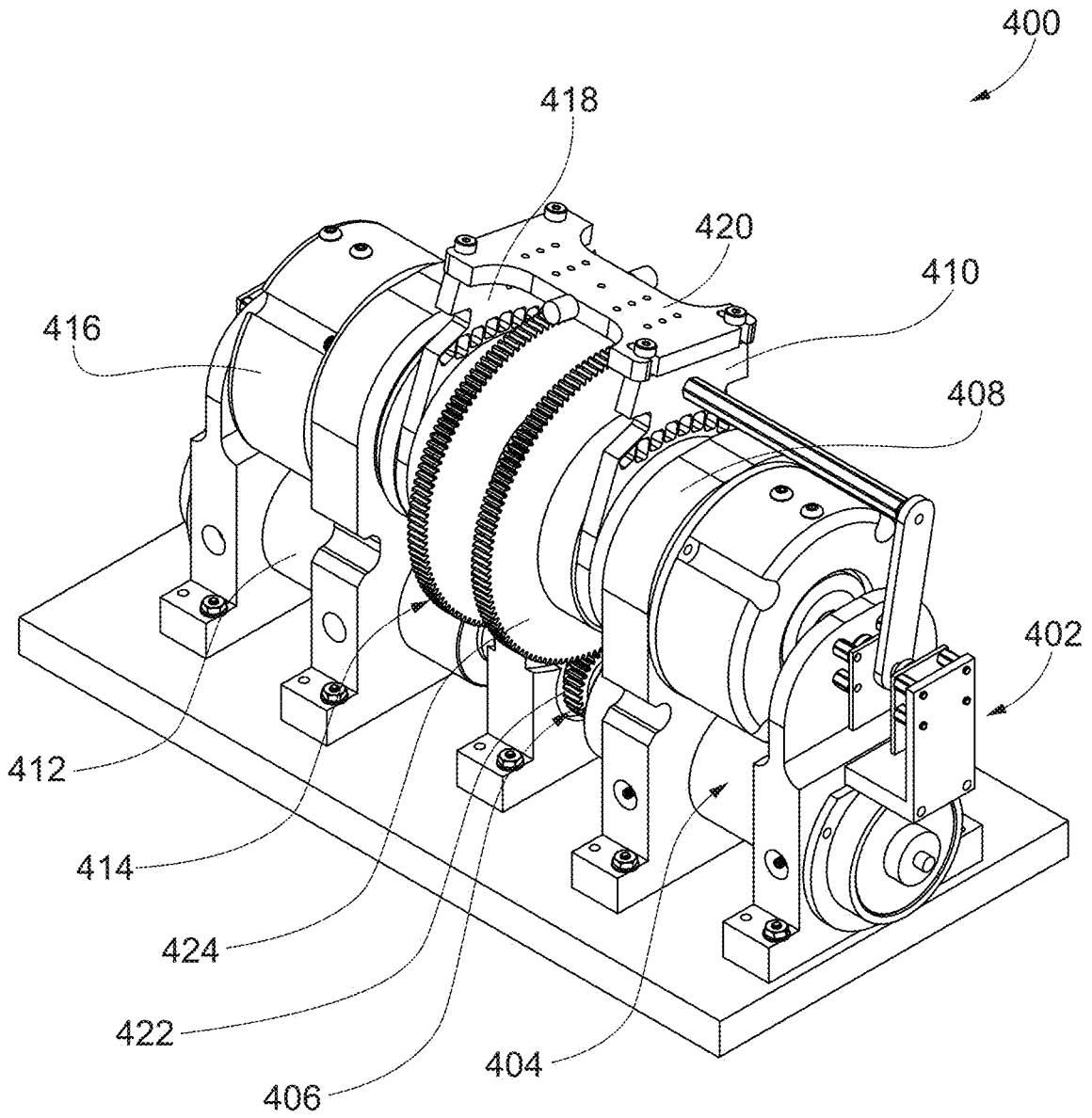
FIG. 4 illustrates a perspective view of a torque generation system.
Figure 5:
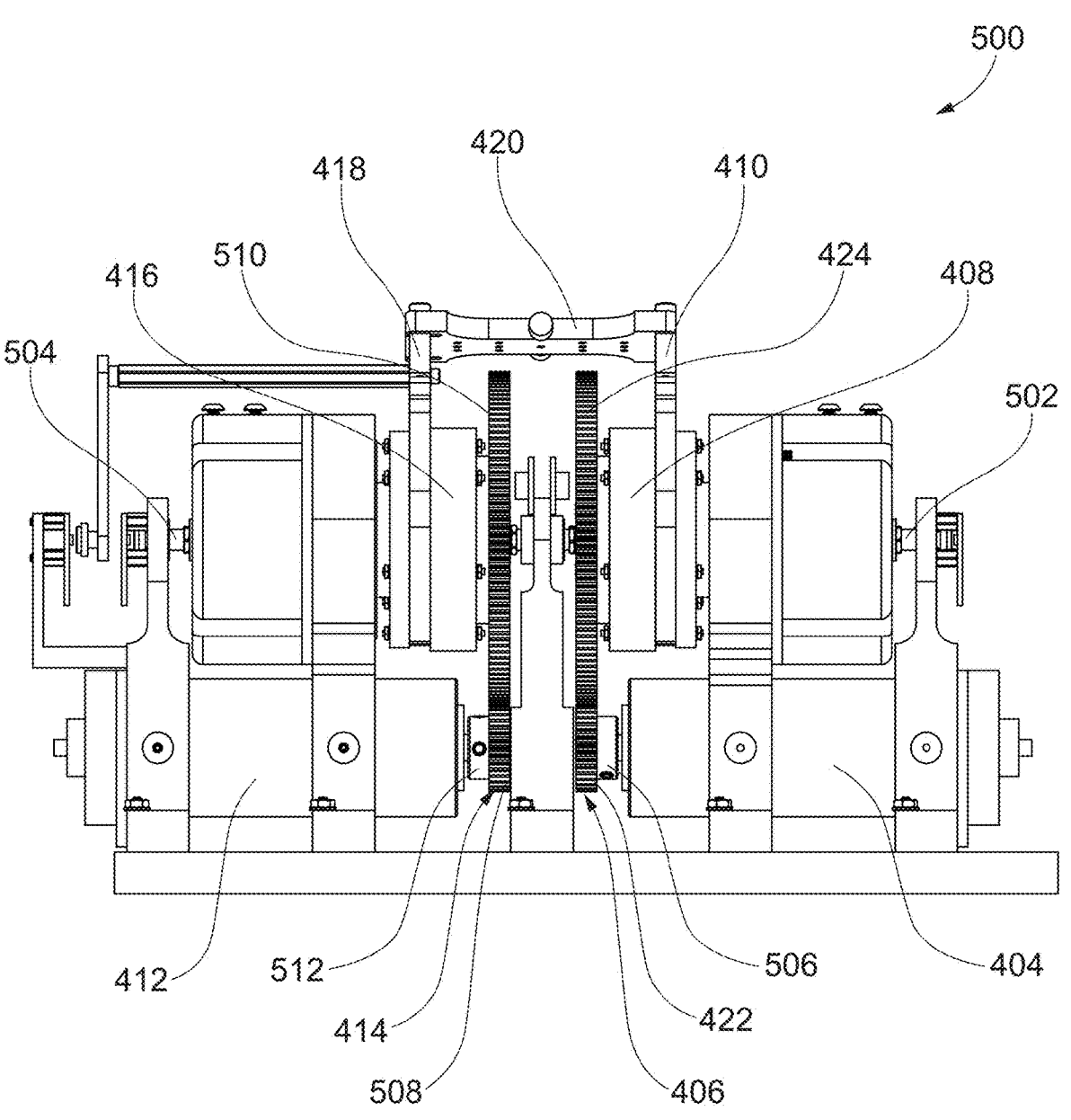
FIG. 5 illustrates a side view of the torque generation system.

FIG. 4 illustrates a perspective view 400 of the torque generation system 402. FIG. 5 illustrates a side view 500 of the torque generation system 402. The torque generation system 402 may include a first torque generator 404, a first transmission mechanism 406, a first frictional interface 408, and a first output plate 410. Similarly, the torque generation system 402 may include a second torque generator 412, a second transmission mechanism 414, a second frictional interface 416, and a second output plate 418. The second output plate 418 may be connected to the first output plate 410 by a connecting link 420. As such, in some configurations, the first frictional interface 408 and the first output plate 410 may be assembled on a first axle 502 (refer to FIG. 5). Moreover, the second frictional interface 416 and the second output plate 418 may be assembled on a second axle 504 (refer to FIG. 5), which is collinear with the first axle 502.

The first torque generator 404 and the second torque generator 412 may include but are not limited to electric motors, harmonic drives, pneumatic or hydraulic actuators, direct drive motors, and the like. Further, the first torque generator 404 and the second torque generator 412 may be coupled to the first transmission mechanism 406 and the second transmission mechanism 414, respectively.

The first transmission mechanism 406 may include a first driving gear 422 and a first driven gear 424. The first driving gear 422 may be coupled to a first output shaft 506 of the first torque generator 404. Further, the first driven gear 424 may be coupled to the first axle 502. Similarly, the second transmission mechanism 414 may include a second driving gear 508 and a second driven gear 510. The second driving gear 508 may be coupled to a second output shaft 512 of the second torque generator 412, and the second driven gear 510 may be coupled to the second axle 504. In some configurations, the output from the first output shaft 506 may be configured to drive the first driving gear 422, which consequently rotates the first driving gear 424. Similarly, the second output shaft 512 output may be configured to rotate the second driving gear 508, which consequently drives the second driven gear 510.

Each of the first transmission mechanism 406 and the second transmission mechanism 414 may be a non-backdrivable transmission mechanism. To further elaborate, each of the first driving gear 422, the first driven gear 424, the second driving gear 508, and the second driven gear 510 may be spur gears configured to transmit rotational motion therebetween, in such a manner that the backdrivability from the first torque generator 404 and the second torque generator 412 may be isolated from the output or the load, i.e., from the first output plate 410 and the second output plate 418, respectively.

The first frictional interface 408 may be engaged to the first transmission mechanism 406. Further, the first frictional interface 408 may be engaged to the first driven gear 424. The first transmission mechanism 406 may be configured to transmit a first input torque generated by the first torque generator 404 to the first frictional interface 408. The first input torque may be generated by the first torque generator 404 and transmitted to the first driving gear 422. The first input torque may be transmitted to the first driven gear 424 from the first driving gear 422, and subsequently to the first frictional interface 408.

Similarly, the second frictional interface 416 may be engaged with the second transmission mechanism 414. Further, the second frictional interface 416 may be engaged with the second driven gear 510. The second transmission mechanism 414 may be configured to transmit a second input torque generated by the second torque generator 412 to the second frictional interface 416. To further elaborate, the second input torque is generated by the second torque generator 412 and transmitted to the second driving gear 508. The second input torque is further transmitted to the second driven gear 510 from the second driving gear 508 and subsequently to the second frictional interface 416.

The first frictional interface 408 and the second frictional interface 416 may include a dry friction clutch pack configured to transmit the first input torque to the first output plate 410 and the second input torque to the second output plate 418, respectively. The dry friction clutch plate works on the principle of dry friction, which may be zeroth-order friction that transmits constant force or torque irrespective of the differential velocity of each of the first torque generator 404 and the second torque generator 412. The dry friction clutch pack is preferred over clutch packs which use viscous friction, because viscous friction, which may be higher-order friction, may allow transmission of torque based on the differential velocity, i.e., the difference between velocities of the first torque generator 404 and the second torque generator 412 with the velocity of the first output plate 410 and the second output plate 418, or in simpler words, the difference in velocities at the source of input torque and the output torque, or the load on the torque generation system 402. Accordingly, any change in the output or change in load resulted due to a change in speed at the output, i.e., at the output plate 410 and the second output plate 418 may be reflected, or in other words, visible at the torque source, i.e., change in torque at the first torque generator 404 and the second torque generator 412 resulting a change in speed of the first torque generator 404 and the second torque generator 412. Moreover, with change in speed at the torque source, i.e., the first torque generator 404 and the second torque generator 412 may be reflected or visible by a change in speed at the output torque. In contrast, the first frictional interface 408 and the second frictional interface 416 with a dry friction clutch pack prevent reflection of the change in speed at the output plate 410 and the second output plate 418 at the first torque generator 404 and the second torque generator 412, and vice versa. Hence, for the first frictional interface 408 and the second frictional interface 416, dry friction clutch packs are preferred over clutch packs which utilize viscous friction.

Moreover, each of the first frictional interface 408 and the second frictional interface 416 may selectively engage and disengage by one or more components, such as a plurality of squeezer plates to transmit input torque to each of the first output plate 410 and the second output plate 418. The plurality of squeezer plates may be configured to engage the first frictional interface 408 and the second frictional interface 416 when subjected to a force resulting from one or more actuators, as explained herein.

Figure 6:
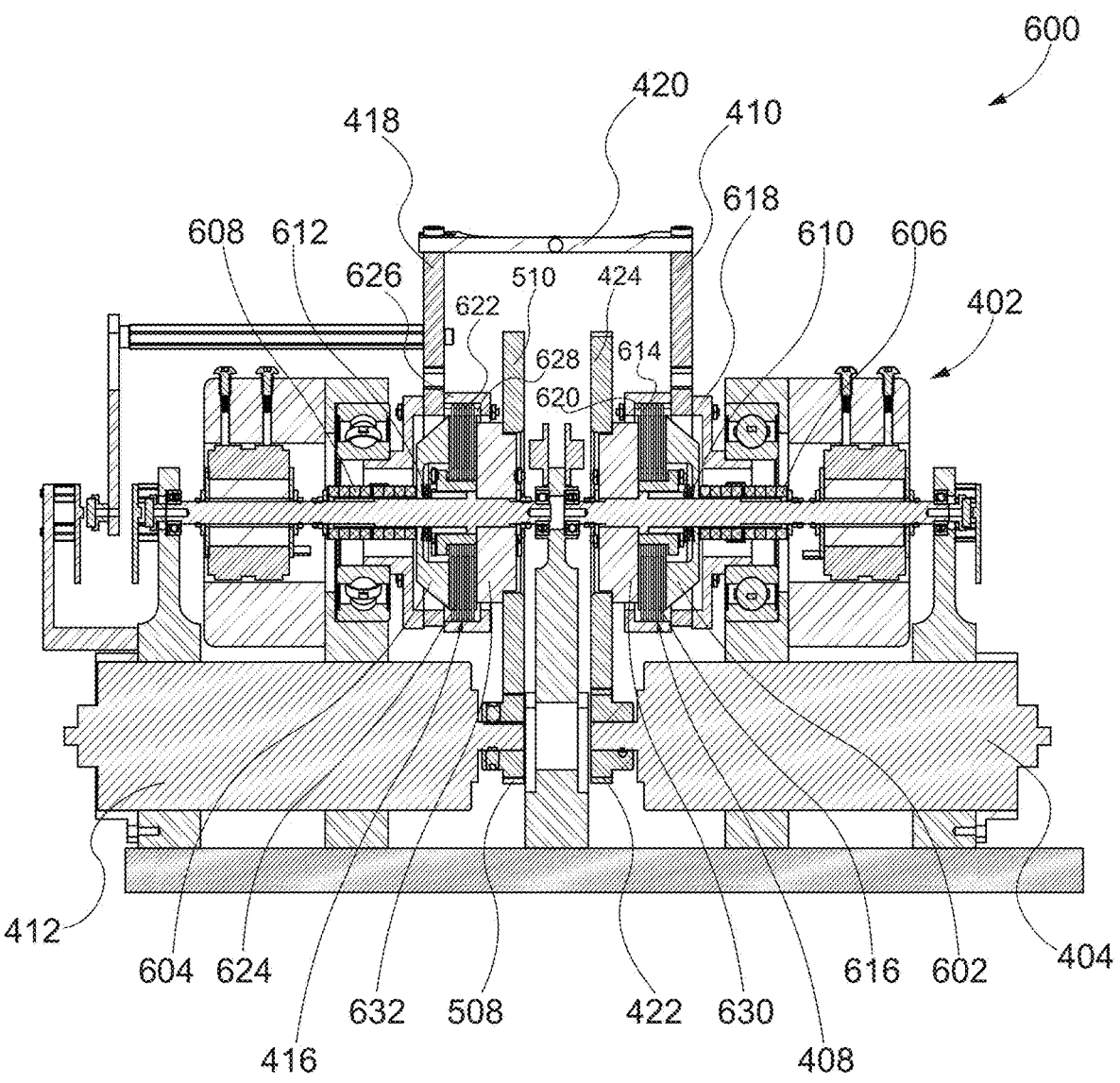
FIG. 6 illustrates a sectional view of the torque generation system.

FIG. 6 illustrates a sectional view of the torque generation system 402. The torque generation system 402 may include a first squeezer plate 602 and a second squeezer plate 604. The first squeezer plate 602 may be configurable to adjoin the first frictional interface 408 and the second squeezer plate 604 may be configured to adjoin the second frictional interface 416. Further, the torque generation system 402 may include a first piezoelectric actuator 606 and a second piezoelectric actuator 608. The first piezoelectric actuator 606 may be coupled to the first squeezer plate 602, and the second piezoelectric actuator 608 may be coupled to the second squeezer plate 604.

In one configuration, the first piezoelectric actuator 606 and the second piezoelectric actuator 608 may include but are not limited to PK44M3B8P2 manufactured by Thorlabs, Inc. Each of the first piezoelectric actuator 606 and the second piezoelectric actuator 608 may include at least one stack of piezoelectric rings or cylindrical chips. For example, the first piezoelectric actuator 606 may include a first stack of piezoelectric rings and a second stack of piezoelectric rings adjoined together. Similarly, the second piezoelectric actuator 608 may include a third stack of piezoelectric rings and a fourth stack of piezoelectric rings adjoined together. Each of the first, second, third, and fourth stack may include about 4-5 piezoelectric rings. Alternatively, the first piezoelectric actuator 606 and the second piezoelectric actuator 608 may include a monolithic piezoelectric ring. Further, the first piezoelectric actuator 606 and the second piezoelectric actuator 608 operate within a drive voltage range of 0 to 150 V, achieving a free stroke displacement of 15.0 $\mu m \pm 15\%$ at maximum voltage. The first piezoelectric actuator 606 and the second piezoelectric actuator 608 demonstrate low hysteresis characteristics of less than fifteen (15%), enabling accurate and repeatable motion profiles under cyclic operation. Under load, the first piezoelectric actuator 606 and the second piezoelectric actuator 608 may be configured to produce a maximum displacement at 1810 N (406 lbs) and a blocking force of 4520 N (1015 lbs) at 150 V. The first piezoelectric actuator 606 and the second piezoelectric actuator 608 may exhibit a resonant frequency of 70 kHz (no load) and an anti-resonant frequency of 80 kHz, with an associated impedance at resonance of 100 $m\Omega$ and a dissipation factor of less than 2.0%, indicating high electromechanical efficiency. The capacitance of each of the first piezoelectric actuator 606 and the second piezoelectric actuator 608 may be rated at 8.4 $\mu F \pm 15\%$, facilitating rapid response times in high-speed actuation environments. The first piezoelectric actuator 606 and the second piezoelectric actuator 608 operates reliably across a wide thermal range of $-25°$ C. to $130°$ C., with a Curie temperature of $230°$ C., allowing for stable performance in personalized mode thermal conditions. The first piezoelectric actuator 606 and the second piezoelectric actuator 608 may include screen-printed silver external electrodes and features a compact form factor with a chip outer diameter of 15.0 mm, an inner diameter of 9.0 mm, and a maximum housing dimension of 17.0 mm width by 13.5 mm length, with dimensional tolerances maintained within $\pm 0.1$ mm. when operated in tandem, the first piezoelectric actuator 606 and the second piezoelectric actuator 608 may be connected in a parallel configuration, and the total stroke is about 30 $\mu m$ at 150V, with an effective capacitance doubled to 16.8 $\mu F$.

With continued reference to FIG. 6, the torque generation system 402 may include a first preload distributor 610 and a second preload distributor 612. The first preload distributor 610 may be adjoined to the first squeezer plate 602 and the second preload distributor 612 may be adjoined to the second squeezer plate 604. As such, the first preload distributor 610, and the second preload distributor 612 may disengage the first squeezer plate 602 from the first frictional interface 408 and the second squeezer plate 604 from the second frictional interface 416. Therefore, any engagement due to a preload acting on the first squeezer plate 602 and the second squeezer plate 604 with the first frictional interface 408 and the second frictional interface 416 may be prevented.

The first preload distributor 610 and the second preload distributor 612 may include, but are not limited to Belleville washers, wave springs, diaphragm springs, elastomeric washers, and the like. In one configuration, the first preload distributor 610 and the second preload distributor 612 may include Belleville washers and be strategically positioned between the frictional interfaces and the squeezer plates. For example, the first preload distributor 610 may include a Belleville washer disposed or positioned between the first frictional interface 408 and the first squeezer plate 602. Similarly, the second preload distributor 612 may include another Belleville washer disposed or positioned between the second frictional interface 416 and the second squeezer plate 604. As such, the Belleville washers may be configured to generate a controlled axial force that prevents unintended engagement under static or low-torque conditions due to preload. By utilizing the inherent load-deflection properties of Belleville washers, the first frictional interface 408 and the first squeezer plate 602, the second frictional interface 416 and the second squeezer plate 604 maintain a predetermined separation distance, which may be a near-zero distance, at which the first squeezer plate 602 and the second squeezer plate 604 may be about to contact the first frictional interface 408 and the second frictional interface 416, thereby ensuring disengagement until a specified force threshold is exceeded. Alternatively, the first preload distributor 610 and the second preload distributor 612 may also enable partial contact of the first squeezer plate 602 and the second squeezer plate 604 with the first frictional interface 408 and the second frictional interface 416. Moreover, the preload may be distributed along the first piezoelectric actuator 606 and the second piezoelectric actuator 608.

In one configuration, the first preload distributor 610 and the second preload distributor 612 may include Belleville washers that may be similar to McMaster-Carr part number 96475K331, available at https://www.mcmaster.com/ 96475K331. Such Belleville washers may include metric spring designed for an 8 mm shaft and manufactured from 17-7 PH stainless steel for enhanced corrosion resistance. The first preload distributor 610 and the second preload distributor 612 may include an inner diameter of 8.2 mm, an outer diameter of 16 mm, a thickness of 0.6 mm, and a free height of 1.05 mm. Under a working load of about 112 lbs (or 500 N), each of the first preload distributor 610 and the second preload distributor 612 compresses to about 0.64 mm, resulting in a deflection of 0.41 mm, and reaches a flat load at 119 lbs (530 N). This spring meets DIN 2093 standards, is RoHS 3 (2015/863/EU) and REACH (EC 1907/2006) compliant, and is DFARS COTS-exempt. It is classified under Schedule B code 732090.5060 and ECCN EAR99. This Belleville washer of the first preload distributor 610 and the second preload distributor 612 maintains tension and returns to its original height after load removal. Multiple springs may be stacked in nested, inverted, or combined arrangements to adjust load capacity and deflection according to system requirements.

The first preload distributor 610 and the second preload distributor 612 may also facilitate preload adjustment on the first piezoelectric actuator 606 and the second piezoelectric actuator 608. For example, the first preload distributor 610 and the second preload distributor 612 may exert 400 pounds of preload to the first piezoelectric actuator 606 and the second piezoelectric actuator 608 while maintaining zero preload on the first frictional interface 408 and second frictional interface 416. Alternatively, the first preload distributor 610 and the second preload distributor 612 may exert 200 pounds of preload to the first piezoelectric actuator 606 and the second piezoelectric actuator 608 and 10 pounds to the first frictional interface 408 and second frictional interface 416. Such adjustability provides significant functional benefits. Specifically, the overall stiffness of the torque generation system 402, which may be a critical parameter for dynamic and static performance, can be increased by increasing preload on the first preload distributor 610 and the second preload distributor 612, enhancing force response and structural stability. Conversely, minimal preload on the first frictional interface 408 and the second frictional interface 416 may be desirable to reduce parasitic friction under low engagement conditions. Additionally, per manufacturer specifications, the piezoelectric elements perform optimally under substantial compressive preload, which this mechanism enables without compromising clutch performance. Thus, this design allows for simultaneous optimization of actuator stiffness and clutch responsiveness through independent mechanical tuning of preload forces.

As explained herein, the first frictional interface 408 and the second frictional interface 416 may be selectively engaged and disengaged to transmit an output torque to each of the first output plate 410 and the second output plate 418. To further elaborate, each of the first frictional interface 408 and the second frictional interface 416 may include a multi-plate clutch pack. For example, the first frictional interface 408 may include a first multi-plate clutch pack, which may include a first series of metal plates 614 stacked with a first series of dry friction plates 616. Further, the first frictional interface 408 may also be enclosed in a first frictional interface outer bushing 618. The first frictional interface outer bushing 618 may be coupled to the metal plates 614 and the dry friction plates 616 with a first output fastener 620. Moreover, the first frictional interface outer bushing 618 may be adjoined to the first output plate 410. Put differently, the first output plate 410 may also be coupled to the first frictional interface 408, particularly with the metal plates 614 and the dry friction plates 616 with the first output fastener 620 via the first frictional interface outer bushing 618.

Similarly, the second frictional interface 416 may include a second multi-plate clutch pack, which may include a second series of metal plates 622 stacked with a second series of dry friction plates 624. Further, the second frictional interface 416 may also be enclosed in a second frictional interface outer bushing 626. The second frictional interface outer bushing 626 may be coupled to the second series of metal plates 622 and the second series of dry friction plates 624 with a second output fastener 628. Moreover, the second frictional interface outer bushing 626 may be adjoined to the second output plate 418. Put differently, the second output plate 418 may also be coupled to the second frictional interface 416, particularly with the second series of metal plates 622 and the second series of dry friction plates 624 with the second output fastener 628 via the second frictional interface outer bushing 626.

In an illustrative configuration, the first series of metal plates 614 and the first series of dry friction plates 616 may be stacked in an alternative manner, i.e., each metal plate from the first series of metal plates 614 is sequential to each dry friction plate from the first series of dry friction plates 616. As such, the end metal plate from the first series of metal plates 614 may contact a first gear plug 630, which may further be coupled to the first driven gear 424. Further, the end friction plate from the first series of dry friction plates 616 may be coupled to the first squeezer plate 602. The first gear plug 630 may be configured to apply a force on the first frictional interface 408, i.e., a force that may be opposite to the force applied by the first squeezer plate 602 on the first frictional interface 408.

In an illustrative configuration, the second series of metal plates 622 and the second series of dry friction plates 624 may be stacked in an alternative manner, i.e., each metal plate from the second series of metal plates 622 is sequential to each dry friction plate from the second series of dry friction plates 624. As such, the end metal plate from the second series of metal plates 622 may contact a second gear plug 632, which may further be coupled to the second driven gear 510. Further, the end friction plate from the second series of dry friction plates 624 may be coupled to the second squeezer plate 604. The second gear plug 632 may be configured to apply a force on the second frictional interface 416, i.e., a force that may be opposite to the force applied by the second squeezer plate 604 on the second frictional interface 416.

As the first squeezer plate 602 may be separated or partially interfaced or adjoined (to an extent which does not allow torque transmission) from the first frictional interface 408, each metal plate from the first series of metal plates 614 may be separated from each dry friction plate from the first series of dry friction plates 616. Hence, the first frictional interface 408 may be disengaged. Accordingly, the first input torque from the first torque generator 404 may not be transmitted to the first output plate 410. Similarly, as the second squeezer plate 604 may be separated from the second frictional interface 416, each metal plate from the second series of metal plates 622 may be separated from each dry friction plate from the second series of dry friction plates 624. Hence, the second frictional interface 416 may be disengaged, and the second input torque may not be transmitted to the second output plate 418.

To allow transmission of the first input torque to the first output plate 410 and the second input torque to the second output plate 418, the first squeezer plate 602 and the second squeezer plate 604 may be actuated to apply a first force to the first frictional interface 408 and a second force to the second frictional interface 416, respectively. In other words, the first squeezer plate 602 may be actuated to apply a first force to the first frictional interface 408, and the second squeezer plate 604 may be actuated to apply a second force to the second frictional interface 416. When actuated, the first frictional interface 408 and the second frictional interface 416 may enter an engaged state to transmit the first input torque to the first output plate 410 and the second input torque to the second output plate 418. The actuation of the first squeezer plate 602 and the second squeezer plate 604 is explained in detail herein.

Figure 7:
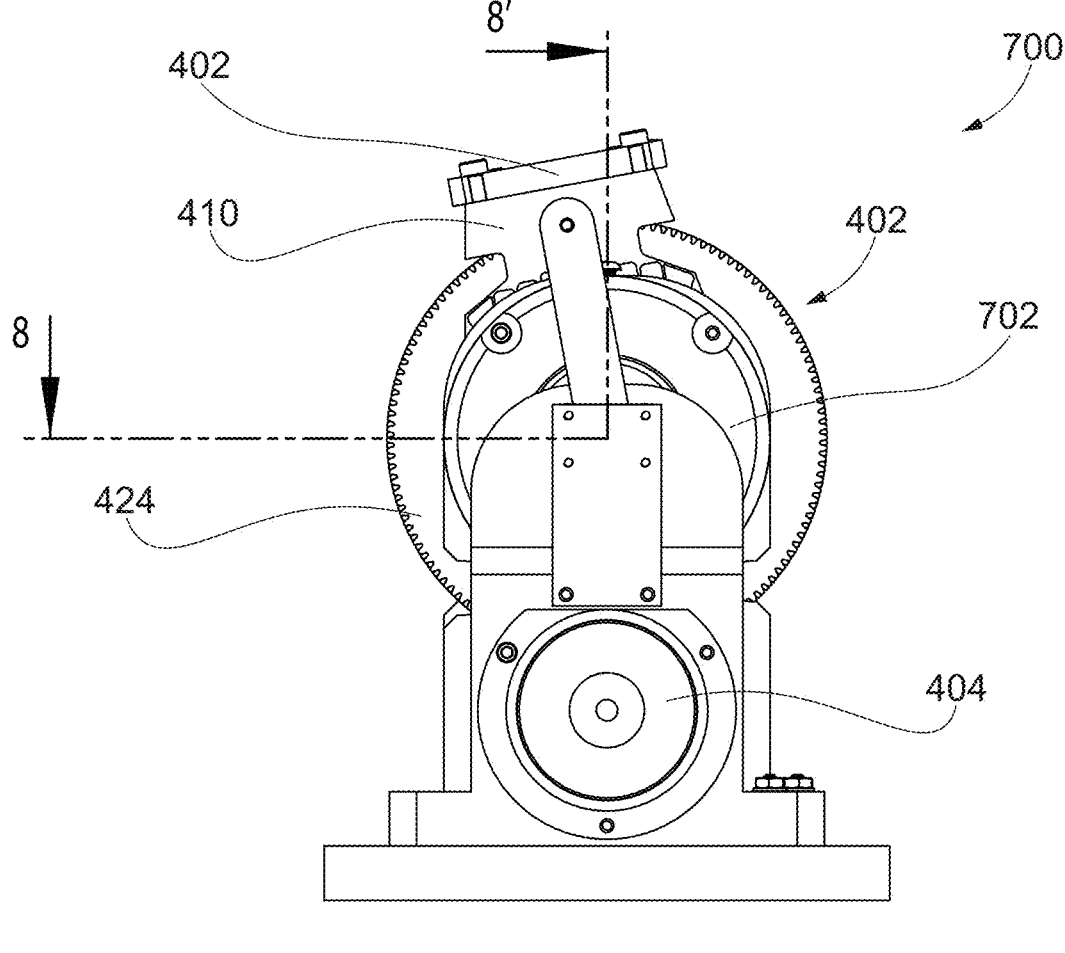
FIG. 7 illustrates a side view of the torque generation system.
Figure 8:
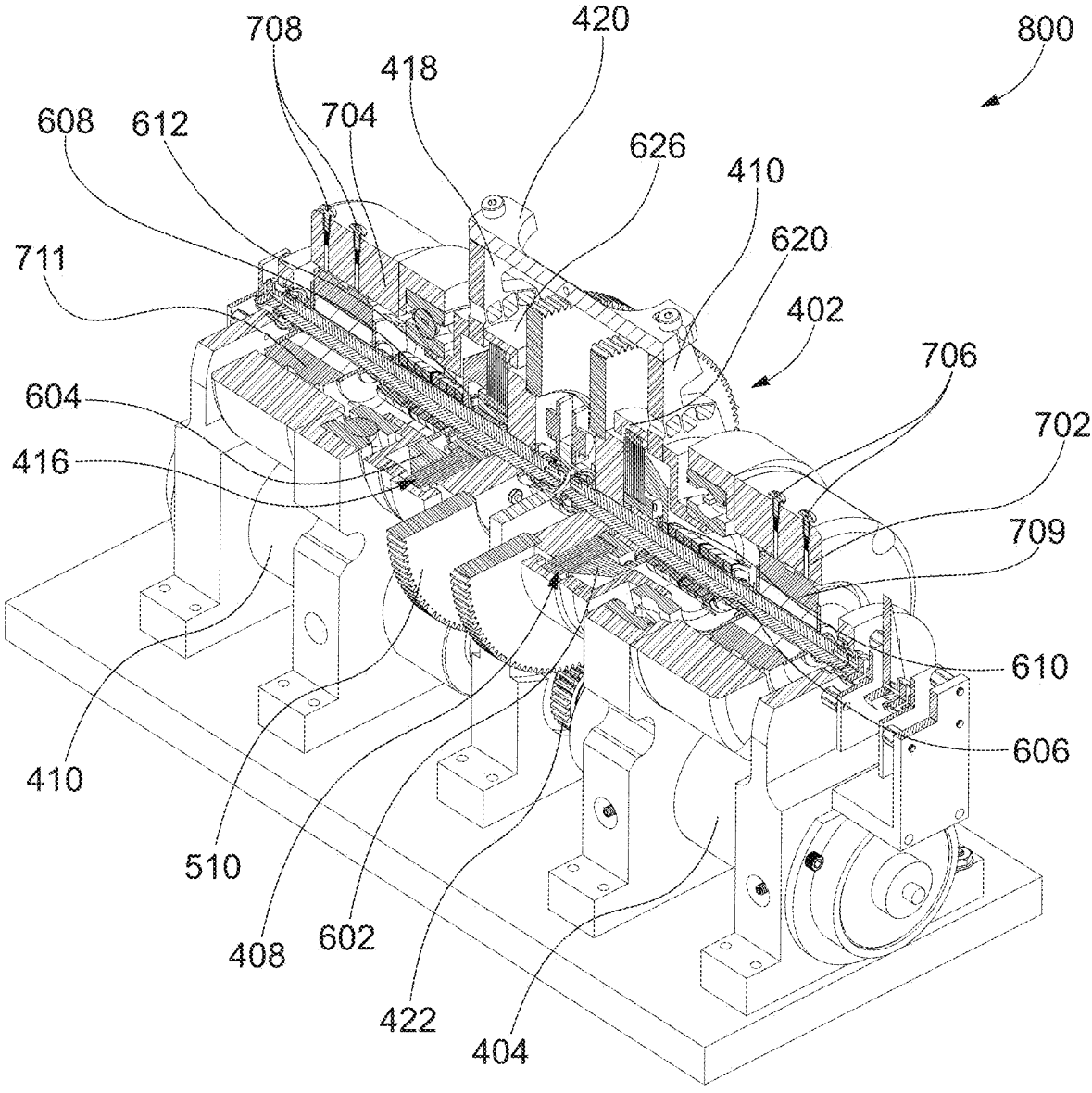
FIG. 8 illustrates a partial sectional view taken along section 8-8' of the torque generation system in FIG. 7.

FIG. 7 illustrates a side view 700 of the torque generation system 402, and FIG. 8 illustrates a partial sectional view 800 taken along section 8-8' of the torque generation system 402 in FIG. 7. The torque generation system 402 may further include a first slip ring 702 and a second slip ring 704 (refer to FIG. 8). The first slip ring 702 may include a first pair of connection bolts 706 and the second slip ring 704 may include a second pair of connection bolts 708. Further, the first pair of connection bolts 706 and the second pair of connection bolts 708 may be coupled to a coil spring and a brush (not shown). Further, the torque generation system 402 may include a first rotor 709 and a second rotor 711. The first rotor 709 may be enclosed in the first slip ring 702 and may contact the coil springs extending from the first pair of connection bolts 706. Further, the second rotor 711 may be enclosed within the second slip ring 704 and may contact the coil springs extending from the second pair of connection bolts 708. The first rotor 709 may be electrically connected to the first piezoelectric actuator 606 via a wiring harness as explained earlier (not shown). Similarly, the second rotor 711 may be electrically connected to the second piezoelectric actuator 608 via another wiring harness similar to the wiring harness explained earlier (not shown).

The first pair of connection bolts 706 and the second pair of connection bolts 708 may include electrically conductive bolts or conductive fasteners such as, but not limited to, standard metal bolts selected from copper bolts, brass bolts, aluminum bolts, and the like. The first pair of connection bolts 706 and the second pair of connection bolts 708 may be connected to a voltage source. Further, the first pair of connection bolts 706 and the second pair of connection bolts

708 may be configured to transmit voltage to the first rotor 709 and the second rotor 711 from the voltage source via the coil spring and brush coupled thereto. Further, the voltage may be transmitted from the first rotor 709 and the second rotor 711 to the first piezoelectric actuator 606 and second piezoelectric actuator 608, respectively. In response, the first piezoelectric actuator 606 and the second piezoelectric actuator 608 may be actuated.

The first piezoelectric actuator 606 and the second piezoelectric actuator 608 may include linearly stacked piezoelectric layers. Further, in response to the voltage, the piezoelectric actuators may be actuated and may generate a high force with a short stroke, typically in microns up to hundreds of microns. The short stroke may result from an expansion of the piezoelectric layers as per the piezoelectric effect, and such expansion may result in the generation of the high force therefrom.

Put differently, the piezoelectric layers in the first piezoelectric actuator 606 and the second piezoelectric actuator 608 may linearly expand while shrinking radially, in response to receiving the voltage. Such expansion may result in the short stroke generation from the first piezoelectric actuator 606 and the second piezoelectric actuator 608 due to the expansion of the piezoelectric layers. The expansion of each of the piezoelectric layers in the first piezoelectric actuator 606 and the second piezoelectric actuator 608 is governed by the voltage supplied. The degree of expansion depends on factors such as the magnitude of the voltage. i.e., higher voltage may result in a higher degree of expansion, and lower voltage may result in a low degree of expansion.

Hence, the short stroke from the first piezoelectric actuator 606 may result in the application of a first actuation force on the first squeezer plate 602 and the short stroke from the second piezoelectric actuator 608 may result in the application of the second actuation force on the second piezoelectric actuator 608. As a result, the first piezoelectric actuator 606 and the second piezoelectric actuator 608 may engage and apply the first actuation force and second actuation force to the first squeezer plate 602 and the second squeezer plate 604, respectively. Further, the first squeezer plate 602 and the second squeezer plate 604 may apply a first force on the first frictional interface 408 and the second force on the second frictional interface 416, thereby engaging the metal plates with the dry frictional plates within each of the first frictional interface 408 and the second frictional interface 416. Consequently, each of the first frictional interface 408 and the second frictional interface 416 may be engaged. It should be noted that for higher degree of expansion, the first force and the second force may be high compared to the first force and second force resulting from a lower degree of expansion.

The torque generation system 402 may include a sensor unit (not shown). The sensor unit may include, but is not limited to output torque sensors, input torque sensors, temperature sensors, length sensors, and the like. The output torque sensors may be configured to sense an output torque transmitted by the first output plate 410 and the second output plate 418. Further, the input torque sensors are configured to sense the first input torque and the second input torque generated by the first torque generator 404 and the second torque generator 412. The input torque sensors and the output torque sensors may include, but are not limited to rotary torque sensors, reaction torque sensors, strain gauge torque sensors, optical torque sensors, and the like. Further, the temperature sensors may include but are not limited to Resistance Temperature Detectors (RTDs), thermistors, thermocouples, and the like. The temperature sensors may be configured to monitor and sense the temperature of the first torque generator 404, the second torque generator 412, the first piezoelectric actuator 606, and the second piezoelectric actuator 608. With the monitoring, the temperature sensors may be configured to prevent overheating in such components or within the torque generation system 402. Further, the length sensors may include but are not limited to capacitive sensors, laser interferometers, strain gauges, eddy power sensors, and the like. The length sensors may be configured to determine a displacement of the first piezoelectric actuator 606 and the second piezoelectric actuator 608 due to expansion. The displacement may be analyzed to regulate the first actuation force and the second actuation force from the first piezoelectric actuator 606 and the second piezoelectric actuator 608.

The torque generation system 402 may be transitioned between a zero-torque condition and a torque generation condition. In the zero-torque condition, each of the first frictional interface 408 and the second frictional interface 416 may be disengaged, thereby preventing torque transfer to the output member. In contrast, the torque generation condition may include each of the first frictional interface 408 and the second frictional interface 416 being engaged to deliver a controlled torque output as explained in detail in conjunction with FIGS. 9-10.

Figure 9:
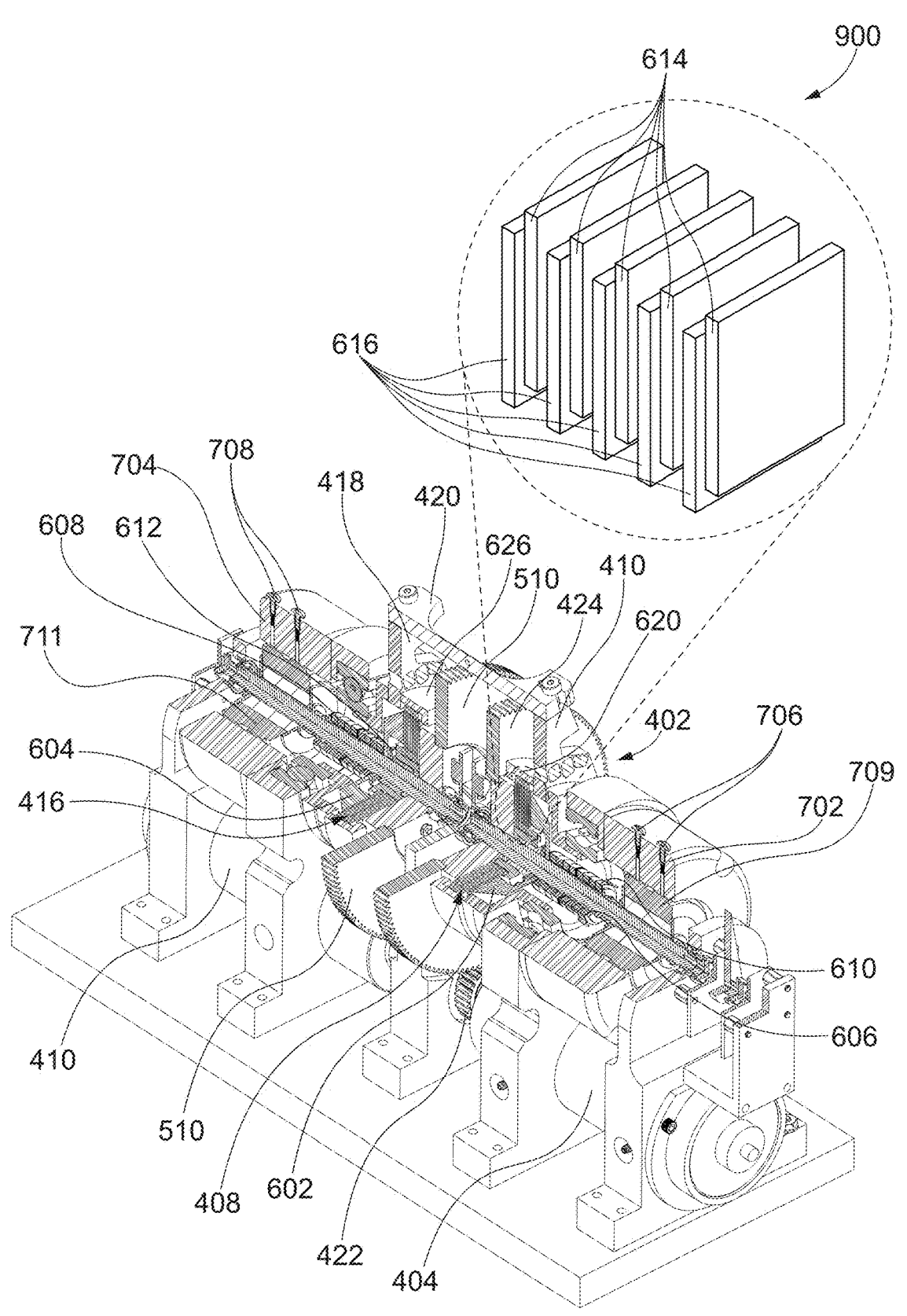
FIG. 9 illustrates a partial sectional view of the torque generation system.
Figure 10:
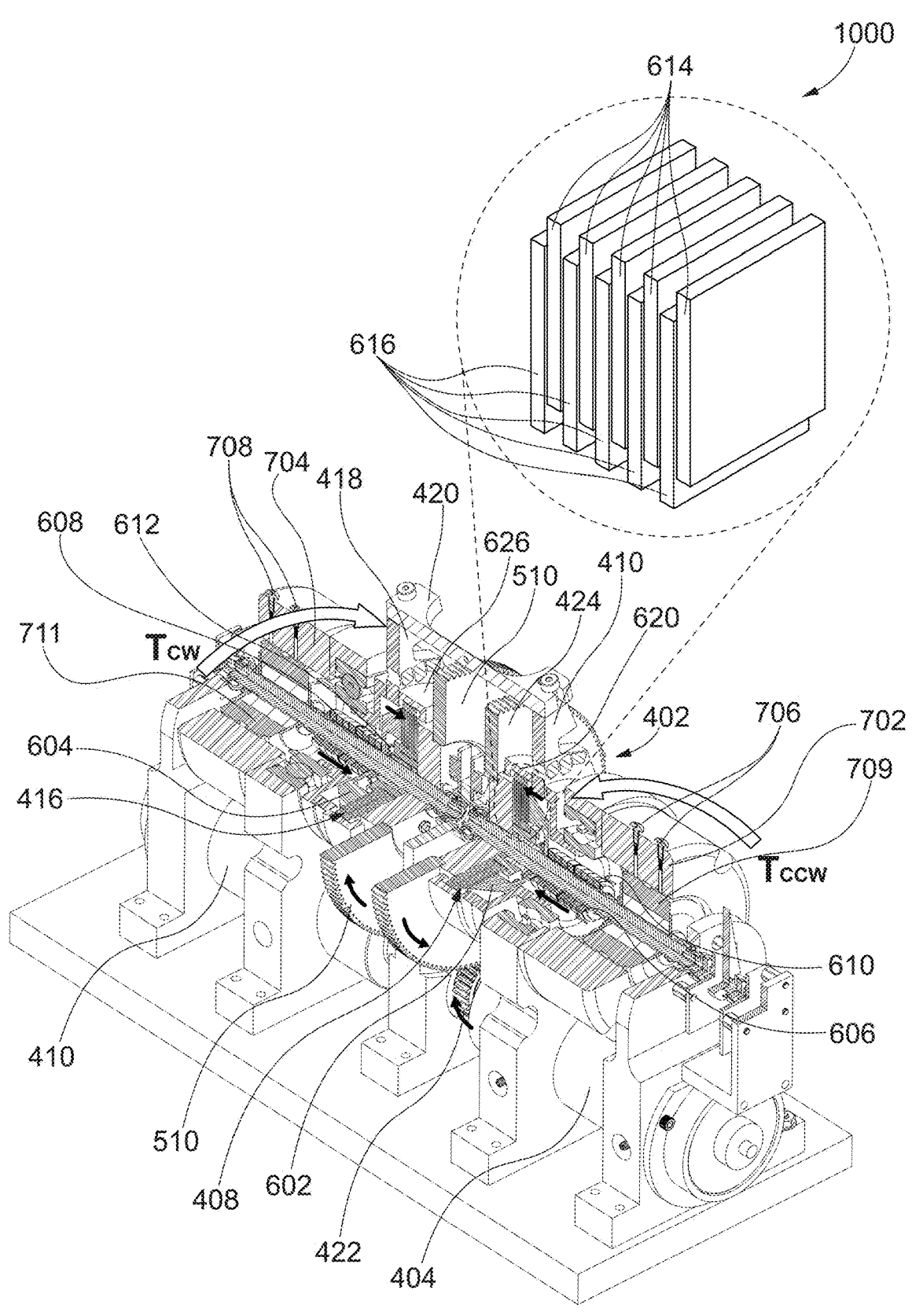
FIG. 10 illustrates a partial sectional view of the torque generation system in the torque generation condition.

FIG. 9 illustrates a partial sectional view 900 of the torque generation system 402 in the zero-torque condition. FIG. 10 illustrates a partial sectional view 1000 of the torque generation system 402 in the torque generation condition. In the zero-torque condition, the first squeezer plate 602 may be disengaged or separated from the first frictional interface 408 by the first preload distributor 610, and the second squeezer plate 604 may be disengaged or separated from the second frictional interface 416 by the second preload distributor 612. Therefore, the first series of metal plates 614 may be separated from the first series of dry friction plates 616, and the second series of metal plates 622 (not shown) may be separated from the second series of dry friction plates 624. Alternatively, the first series of metal plates 614 may also be partially engaged (not engaged enough to allow transmission) with the first series of dry friction plates 616. Similarly, the second series of metal plates 622 may also be partially engaged (not shown) with the second series of dry friction plates 624. As a result, the first torque from the first torque generator 404 may not be transmitted to the first output plate 410, and the second torque from the second torque generator 412 may not be transmitted to the second output plate 418. In such cases, no output torque may be generated.

In contrast, with continued reference to FIG. 10, the torque generation system 402 may be transitioned to the torque generation condition upon actuation of the first piezoelectric actuator 606 and the second piezoelectric actuator 608. As explained herein, the first piezoelectric actuator 606 and the second piezoelectric actuator 608 may be actuated based on the voltage received from the electric power source. In response to the voltage, the first piezoelectric actuator 606 and the second piezoelectric actuator 608 may be configured to apply the first actuation force and the second actuation force on the first squeezer plate 602 and the second squeezer plate 604, respectively, as indicated by the indicia. Further, the first squeezer plate 602 and the second squeezer plate 604 may be configured to apply the first force and the second force on the first frictional interface 408 and the second frictional interface 416, respectively, as indicated by the indicia. Therefore, the first series of metal plates 614 may engage with the first series of the dry friction plates 616, and the second series of the metal plates 622 may engage with the second series of dry friction plates 624. The first input torque and the second input torque may be transmitted from the first torque generator 404 and the second torque generator 412 to the first frictional interface 408 and the second frictional interface 416, respectively, and may be further transmitted to the first output plate 410 and the second output plate 418, respectively.

The first torque generator 404 may be configured to generate a first torque in a first torque direction. The first torque may be transmitted to the first transmission mechanism 406, particularly to the first driving gear 422 and the first driven gear 424. Further, the first driven gear 424 may be configured to rotate the first series of metal plates 614 about the first axle 502 (refer to FIG. 5). As the first piezoelectric actuator 606 may be actuated, the first actuation force may be applied on the first squeezer plate 602, and the first squeezer plate 602 may apply a first force overcoming the force applied by the first preload distributor 610 on the first squeezer plate 602. Hence, the first squeezer plate 602 engages and applies the first force on the first frictional interface 408. Similarly, the second torque generator 412 may be configured to generate a second torque in the second direction. The second torque may be transmitted to the second transmission mechanism 414, particularly to the second driving gear 508 and the second driven gear 510. The second driven gear 510 may be configured to rotate the second series of metal plates 622 about the second axle 504 (refer to FIG. 5). As the second piezoelectric actuator 608 may be actuated, the second actuation force may be applied to the second squeezer plate 604. In response, the second squeezer plate 604 may apply a second force overcoming the force the second preload distributor 612 applied on the second squeezer plate 604. Hence, the second squeezer plate 604 may engage and apply a second force on the second frictional interface 416.

Further, the first input torque may be received by the first series of metal plates 614 of the first frictional interface 408, and the second input torque may be received by the second series of metal plates 622 of the second frictional interface 416. Further, the first input torque may be transmitted from the first series of metal plates 614 to the first series of dry friction plates 616, and the second input torque may be transmitted from the second series of metal plates 622 to the second series of dry friction plates 624. Hence, the first series of metal plates 614 and the first series of dry friction plates 616 may be collectively rotated with the first output fastener 620 (not shown). Similarly, the second series of metal plates 622 and the second series of dry friction plates 624 may be rotated with the second output fastener 628 (not shown). Consequently, due to the rotation of the first output fastener 620, the first frictional interface outer bushing 618 may be rotated, and due to the rotation of the second output fastener 628, the second frictional interface outer bushing 626 may be rotated. The first output plate 410 may rotate with the first frictional interface outer bushing 618, and the second output plate 418 may rotate with the first output fastener 620. As a result, the first input torque and the second input torque received by the first frictional interface 408 and the second frictional interface 416 may be transmitted to the first output plate 410 and the second output plate 418, respectively. Accordingly, the first output plate 410 with the first input torque may generate a first output torque, and the second output plate 418 with the second input torque may generate a second output torque.

The use of the first piezoelectric actuator 606 and the second piezoelectric actuator 608 enables rapid, high-precision actuation with minimal mechanical complexity, addressing the limitations of conventional systems that suffer from slow response times and excessive structural complexity. By leveraging the high-speed response characteristics of piezoelectric materials in the first piezoelectric actuator 606 and the second piezoelectric actuator 608, actuation speed and response time while generating or transmitting with reduced reflected inertia and minimized backlash, the first output torque and the second output torque may be enhanced. Hence, rendering the torque generation system 402 well-suited for high-speed robotic applications where precise and efficient engagement of frictional interfaces is critical.

With continued reference to FIG. 10, the direction of the first output torque may be similar to the direction of the first torque, and the direction of the second output torque may be similar to the direction of the second input torque. The direction of the first input torque and the first output torque and the direction of the second input torque and the second output torque generated may be counterclockwise (indicated by $T_{CCW}$ in FIG. 10-14) or clockwise (indicated by $T_{CW}$ in FIGS. 10-14). Further, the first direction may be opposite, or similar to the second direction, based on one or more operational states.

The first output plate 410 and the second output plate 418 are mechanically linked via a connecting link 420, as shown in FIG. 4. When the first torque direction is opposite to the second torque direction, the resulting output torque is determined by the direction associated with the higher torque magnitude. Conversely, when the first and second torque directions are equivalent, the output torques are combined, or the first output plate 410 and the second output plate 418 collectively generate an increased net output torque. This configuration enables adaptive torque generation based on the interaction of the two output plates, enhancing performance in applications requiring dynamic torque control and load balancing.

The one or more operational states may include a partially engaged state, a completely engaged state, and a selectively disengaged state for each of the first frictional interface 408 and the second frictional interface 416. In other words, the one or more operational states may include controlling engagement of each of the first frictional interface 408 and the second frictional interface 416. The first series of metal plates 614 with the first series of dry friction plates 616 of the first frictional interface 408 and the second series of metal plates 622 with the second series of dry friction plates 624 of the second frictional interface 416 to generate output torque for various applications, such as but not limited to haptic mode, holding mode, shutdown mode, torque increment mode, and the like. The controlling of the engagement of each of the first frictional interface 408 and the second frictional interface 416 may be implemented through a controller communicably coupled to the torque generation system 402, which is described hereinafter.

Figure 11:
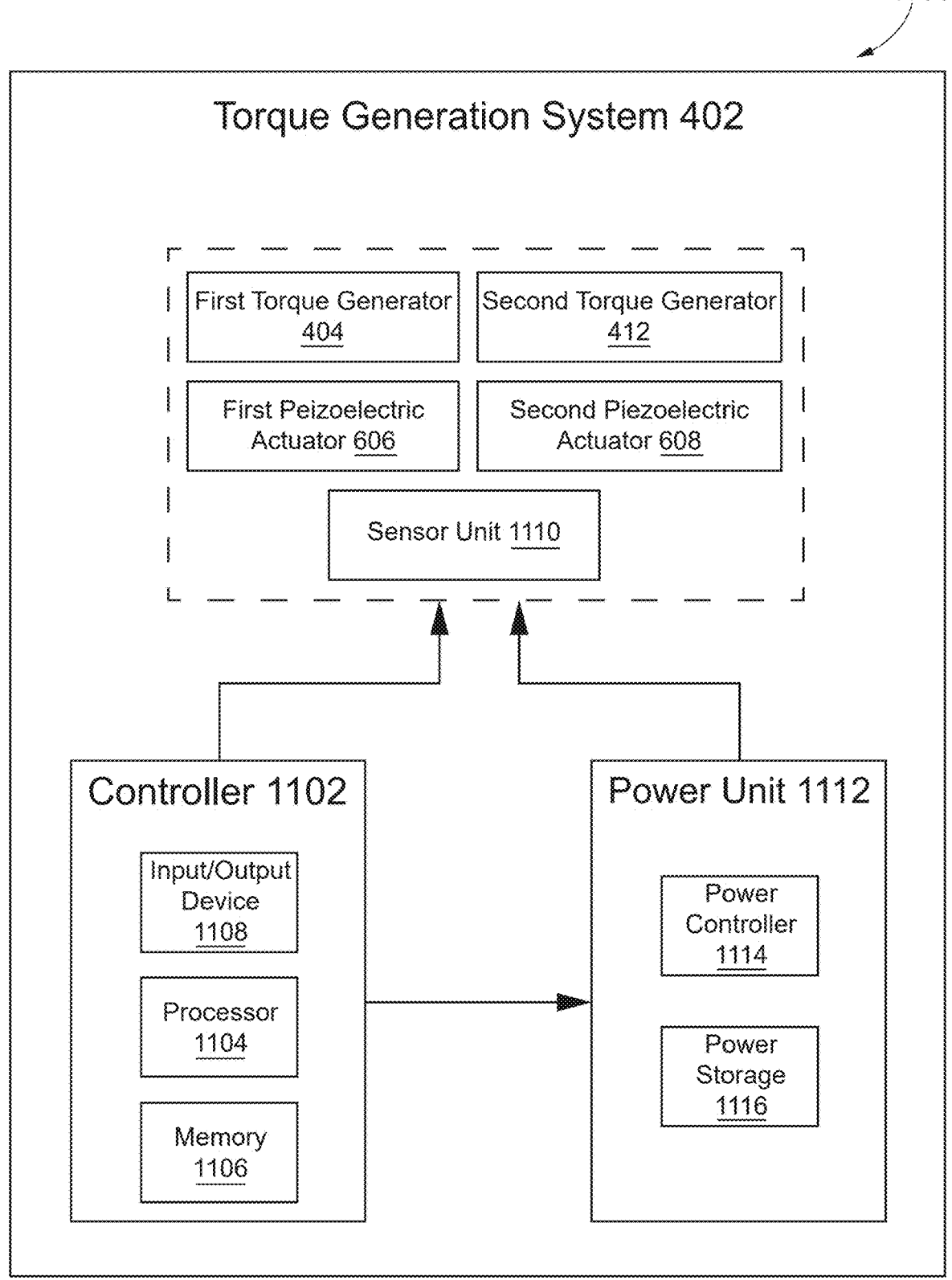
FIG. 11 illustrates a functional layout of the torque generation system.

FIG. 11 illustrates a functional layout 1100 of the torque generation system 402. The torque generation system 402 may further include a controller 1102. The controller 1102 may further include one or more processor(s) 1104, a memory 1106, and an input/output device 1108. The one or more processor(s) 1104 may be implemented as one or more microprocessors, microcomputers, single board computers, microcontrollers, digital signal processors, central processing units, graphics processing units, logic circuitries, and/or any devices that manipulate data based on operational instructions. Among other capabilities, the one or more processor(s) 1104 are configured to fetch and execute computer-readable instructions stored in the memory 1106 of the controller 1102. The memory 1106 may store one or more computer-readable instructions or routines, which may be fetched and executed to create or share the data units over a network service. The memory 1106 may include any non-transitory storage device including, for example, volatile memory such as RAM, or non-volatile memory such as EPROM, flash memory, etc. In an embodiment, the controller 1102 may be connected to a cloud server comprising the one or more processor(s) 1104 and the memory 1106 in form of a cloud database. The one or more processor(s) 1104 may be configured to process data stored in the memory 1106 in the controller 1102 or in form of cloud database.

The input/output devices 1108 may include a variety of interface(s), for example, interfaces for data input and output devices, and the like. The input/output devices 1108 may facilitate inputting of instructions by a user communicating with the controller 1102. In an exemplary configuration, the input/output devices 1108 may be wirelessly connected to the controller 1102 through wireless network interfaces such as Bluetooth®, infrared, or any other wireless radio communication known in the art. In an embodiment, the input/output devices 1108 may be connected to a communication pathway for one or more components of the controller 1102 to facilitate the transmission of inputted instructions and output the results of data generated by various components such as, but not limited to, the one or more processor(s) 1104 and the memory 1106.

The controller 1102 may be implemented in any computing device that may be automatically configured or controlled by a user. Further, the user can communicate with the controller 1102 through one or more user devices (not shown) that can be communicatively coupled to the controller 1102 through a wired or a wireless connection or provided as one or more input/output devices 1108. The user device (not shown) may include a variety of computing systems, including but not limited to physical manipulation, a touch enabled computing device, Artificial Intelligence (AI) enabled interface, laptop computer, a virtual reality/augmented reality/mixed reality (VR/AR/MR) enabled or integrated interface, a desktop computer, a notebook, a workstation, a portable computer, a personal digital assistant, a handheld device, a joystick or a mobile device. In an embodiment, the input/output devices 1108 may be configured to receive inputs from the user in form of, but not limited to, touch, gaze, gesture, voice commands, etc.

With continued reference to FIG. 11, the torque generation system 402 may include a power unit 1112. The power unit 1112 may include a power controller 1114 and a power storage 1116. The power storage 1116 may include but not limited to a rechargeable battery, fuel cell, or a hybrid power source, and the like, to supply voltage to the torque generation system 402, to drive the first frictional interface 408, the second frictional interface 416, the first piezoelectric actuator 606, and the second piezoelectric actuator 608.

The power controller 1114 may include a power input module configured to receive voltage from the power storage 1116, and a voltage regulation circuit to ensure that stable voltage levels are provided to the first frictional interface 408, the second frictional interface 416, the first piezoelectric actuator 606, and the second piezoelectric actuator 608. Moreover, the voltage regulation circuit may be communicably coupled and operated by the controller 1102.

The controller 1102 with a sensor unit 1110 integrated within the torque generation system 402 may be configured to monitor one or more operational parameters of the torque generation system 402. For example, and as explained herein, the sensor unit 1110 may include, but is not limited to output torque sensors, input torque sensors, temperature sensors, length sensors, force sensors, and the like. Using the sensor data from output torque sensors, the controller 1102 may be configured to monitor the first output torque and the second output torque transmitted by the first output plate 410 and the second output plate 418. Further, with the sensor data from the input torque sensors, the controller 1102 may be configured to monitor the first input torque and the second input torque generated by the first torque generator 404 and the second torque generator 412. Further, with the sensor data from the temperature sensors, the controller 1102 may be configured to monitor and sense the temperature of the first torque generator 404, the second torque generator 412, the first piezoelectric actuator 606, and the second piezo-electric actuator 608. Further, with the sensor data from the length sensors, the controller 1102 may be configured to monitor a displacement of the first piezoelectric actuator 606 and the second piezoelectric actuator 608. The displacement may be further analyzed by the controller 1102 to regulate the first actuation force and the second actuation force from the first piezoelectric actuator 606 and the second piezo-electric actuator 608. Additionally, with the sensor data from the force sensors, the controller 1102 may be configured to monitor the first force, the second force, the first actuation force, and the second actuation force.

The controller 1102, using a set of instructions embedded in the memory 1106 and various sensor data from the sensor unit 1110, may be configured to control the engagement of each of the first frictional interface 408 and the second frictional interface 416. The set of instructions may be embedded as any one of algorithm modules, logic modules, lookup tables, and the like. The set of instructions when executed by the controller 1102 may be configured to control the engagement of each of the first frictional interface 408 and the second frictional interface 416 between a completely engaged state, a partially engaged state, selective disengaged state, or a shutdown state.

Figure 12:
FIG. 12 illustrates a module block diagram of the set of instructions embedded as one or more modules in a memory.

FIG. 12 illustrates a module block diagram 1200 of the set of instructions embedded as one or more modules in the memory 1106. The memory 1106 may include a complete engagement module 1202, a partial engagement module 1204, a selective disengagement module 1206, a shutdown module 1208, and a torque generator operational module 1210.

The controller 1102 with the complete engagement module 1202 may be configured to generate an engagement signal to the power controller 1114 to attain the completely engaged state. In response to the engagement signal, the power controller 1114 may transmit electric power from the power storage 1116 to the first piezoelectric actuator 606 and the second piezoelectric actuator 608. Consequently, the first piezoelectric actuator 606 and the second piezoelectric actuator 608 may be expanded up to a maximum degree of expansion, such that the first actuation force and the second actuation force may be at a maximum magnitude. Hence, the magnitude of the first force and the second force applied by the first squeezer plate 602 on the first frictional interface 408, and the second squeezer plate 604 on the second frictional interface 416 may be at a maximum value to ensure frictional interface 408 and the second frictional interface 416 to be completely engaged.

The controller 1102 with the partial engagement module 1204 may be configured to generate a partial engagement signal to the power controller 1114 to attain the partially engaged state. In response, the power controller 1114 may be configured to transmit a reduced voltage (for example, 60% of the voltage transmitted in case of complete engagement) to the first piezoelectric actuator 606 and the second piezo-electric actuator 608. It must be noted that the voltage transmitted to the first piezoelectric actuator 606 and the second piezoelectric actuator 608 may be less than the voltage transmitted upon the actuation of the complete engagement signal. Hence, the first piezoelectric actuator 606 and the second piezoelectric actuator 608 may be configured to apply the first actuation force and the second actuation force on the first squeezer plate 602 and the second squeezer plate 604 at a lower intensity. Consequently, the first and second forces may be lower; thus, the first frictional interface 408 and the second frictional interface 416 may be partially engaged.

The controller 1102 with the selective disengagement module 1206 may be configured to generate a disengage-ment signal to the power controller 1114 to attain the selectively disengaged state. The power controller 1114, in response to the disengagement signal, may be configured to transmit voltage to either the first piezoelectric actuator 606 or the second piezoelectric actuator 608. As a result, only one of the first piezoelectric actuator 606 or the second piezoelectric actuator 608 may be actuated. For example, if the first piezoelectric actuator 606 may be actuated, the first actuation force may be transmitted to the first squeezer plate 602. Further, the first squeezer plate 602 may apply the first force to the first frictional interface 408.

The controller 1102 with the shutdown module 1208 may be configured to generate a shutdown signal to the power controller 1114 to attain the shutdown state. In response, no voltage may be supplied to the first piezoelectric actuator 606 and the second piezoelectric actuator 608. Moreover, no voltage may be transmitted to the first torque generator 404 and the second torque generator 412 in response to the shutdown signal.

The controller 1102, with the torque generator operational module 1210, controls the operation of a first torque gen-erator 404 and a second torque generator 412 by generating an operational signal to the power controller 1114. The power controller 1114 may transmit electric power by at least one operation mode, which includes at least one of the following—an operating mode where the torque generators actively produce torque, a passive braking mode where torque generation is minimized or halted to resist motion without active input, and a shutdown mode where the torque generators are fully deactivated. This configuration ensures precise control over torque output, enabling efficient perfor-mance in applications requiring adaptive torque manage-ment, controlled braking, and system safety shutdowns.

The completely engaged state, the partially engaged state, the selectively disengaged state, and the shutdown state may be selectively utilized in real-time personalized modes in addition to optimizing power consumption, torque response, and overall system stability. The real-time personalized modes may include but are not limited to gravity compen-sation, haptic feedback, torque control, low-power holding, emergency shutdown, conventional actuation, torque ampli-fication, and the like. For example, Table 1 below illustrates various real-time personalized modes by the completely engaged, partially engaged, selectively disengaged, and shutdown states. Furthermore, the various real-time personalized modes are explained in detail in conjunction with FIGS. 13-15.

As such, the first torque generator 404 and the second torque generator 412 may generate torque in a similar direction (as seen in the figure). Accordingly, rather than subtracting the

TABLE 1

| Real-time personalized modes | First frictional interface 408 | Second frictional interface 416 | First torque generator 404 | Second torque generator 412 | Operational state |
|---|---|---|---|---|---|
| *Real-time Personalized modes with Operational states* | | | | | |
| Gravity compensation | Partially engaged | Partially Engaged | Rotating Forwards | Rotating Backwards | Partially engaged state |
| Haptic Feedback | Partially engaged | Partially Engaged | Rotating Forwards | Rotating Backwards | Partially engaged state |
| Torque Control | Partially engaged | Partially Engaged | Rotating Forwards | Rotating Backwards | Partially engaged state |
| Low-Power Holding | Completely Engaged | Completely Engaged | Stopped | Stopped | Completely Engaged State |
| Torque-Amplification | Completely Engaged | Completely Engaged | Rotating | Co-Rotating with a reference frame of the first torque generator 404 | Completely Engaged State |
| Speed Matching | Partially Engaged | Partially Engaged | Rotating | Rotating opposite to a reference frame of the first torque generator 404 | Partially Engaged State |
| Conventional Actuation | Completely Engaged | Dis-engaged | Rotating | Stopped | Selectively disengaged |
| Emergency Shutdown | Passively Disengaged | Passively Disengaged | Passively Halted | Passively Halted | None |

Figure 13:
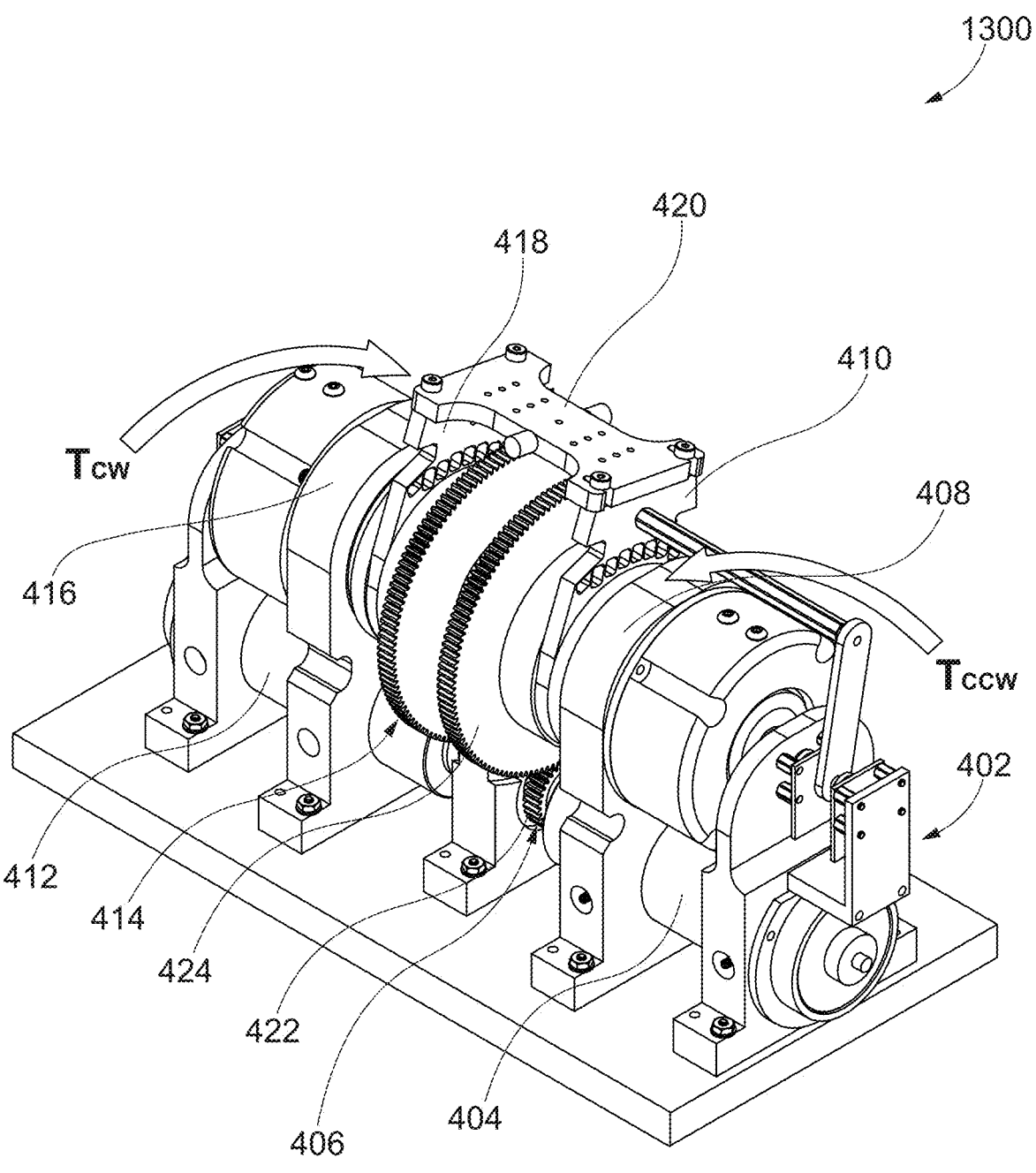
FIG. 13 illustrates a perspective view of the torque generation system.

FIG. 13 illustrates a perspective view 1300 of the torque generation system 402. As explained herein, the controller 1102 with the complete engagement module 1202 may attain the completely engaged state, in which each of the first frictional interface 408 and the second frictional interface 416 may be completely engaged. The completely engaged state may be utilized for low-power holding personalized mode. The low-power holding personalized mode may utilize the first piezoelectric actuator 606 and the second piezoelectric actuator 608 to engage each of the first frictional interface 408 completely and the second frictional interface 416, with minimal torque generated by the first torque generator 404 and the second torque generator 412. For example, the power controller 1114 may cease voltage supply to the first torque generator 404 and the second torque generator 412 during the completely engaged condition. As a result, the first torque generator 404 and the second torque generator 412 may not be operated. Additionally, due to static friction in the first series of dry friction plates 616 and the second series of dry friction plates 624 within the first frictional interface 408 and the second frictional interface 416, the torque generation system 402 may be locked. When implemented in the systems illustrated in FIGS. 1-3, low power holding may be useful for power-efficient holding or handling objects with joint stability.

Figure 14:
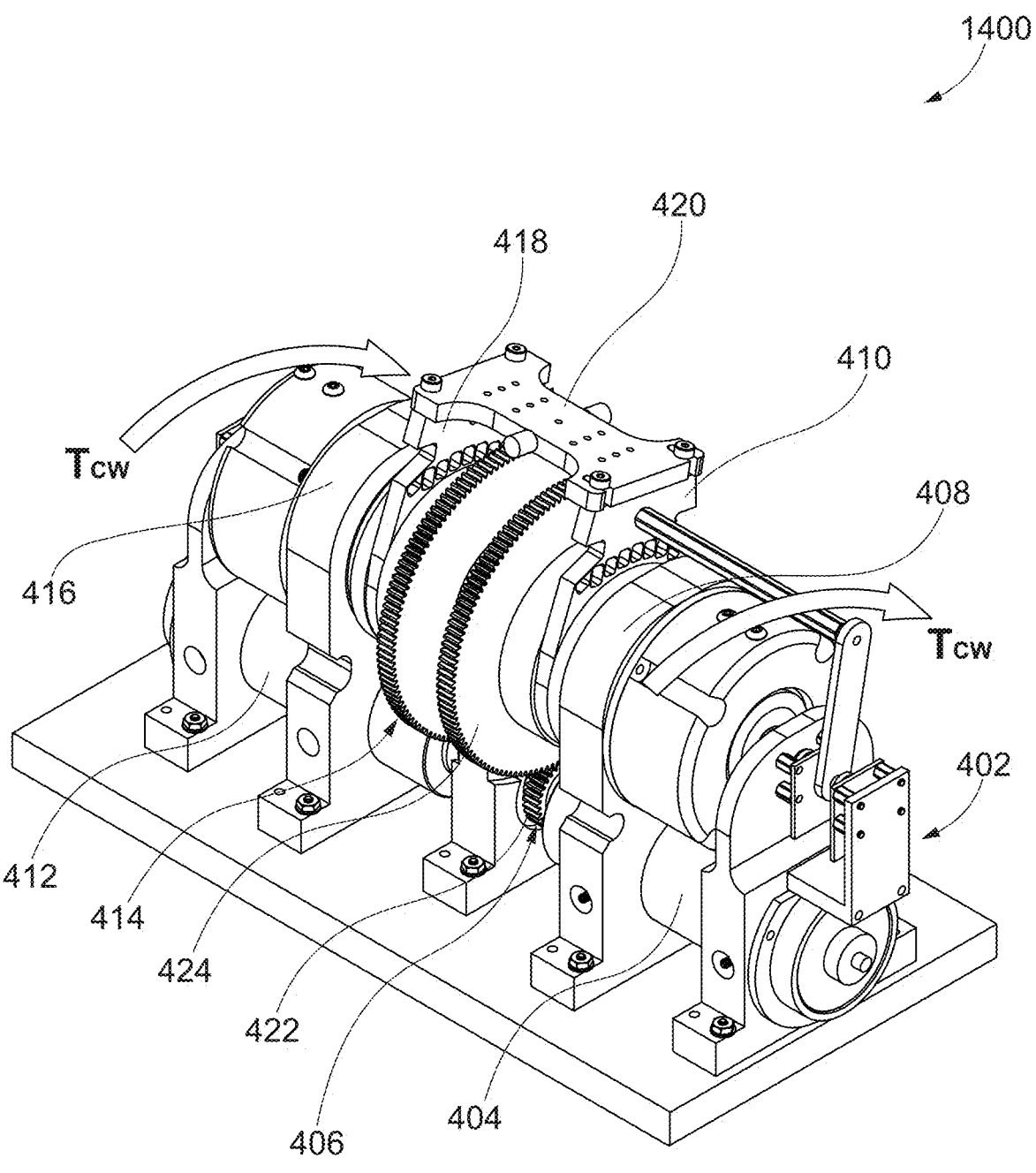
FIG. 14 illustrates a perspective view of the torque generation system.

FIG. 14 illustrates a perspective view 1400 of the torque generation system 402 operating under a torque amplification personalized mode. In some applications requiring heavy-load manipulation or high-resistance operations, the first output and the second output torque may be synced to amplify the overall output torque. For instance, the power controller 1114 in the engaged state may be configured to transmit voltage with a polarity similar to that of the first torque generator 404 and the second torque generator 412.

first output torque from the second output torque, the first and second output torque may be combined in an additive manner to enhance the overall output torque.

In the partially engaged state, controller 1102 with the partial engagement module 1204 may attain the partially engaged state, in which each of the first frictional interface 408 and the second frictional interface 416 may be partially engaged. The partially engaged state may be utilized for various personalized modes, such as gravity compensation personalized mode, speed matching personalized mode, haptic feedback personalized mode, and torque control personalized mode. The gravity compensation personalized mode may be utilized in robotic systems, in which an output torque generated by partial engagement of each of the first frictional interface 408 and the second frictional interface 416 at one or more joints of a robotic system may substantially counteract gravitational forces acting on corresponding robotic arms. In this personalized mode, manual manipulation of the robotic arms may be facilitated with minimal exertion, thereby enabling precise positioning of the limbs into a desired configuration without requiring continuous actuation of the first torque generator 404 and the second torque generator 412.

The haptic feedback personalized mode extends the functionality of the Gravity Compensation personalized mode by generating simulated torques by the torque generation system 402 corresponding to a virtual or remote object. This simulation provides tactile or haptic feedback to a human operator, enhancing user interaction with the robotic system. For example, in surgical or teleoperated applications, the robotic system may be configured to provide force feedback that emulates real-world interaction forces, thereby improving the operator's ability to perform delicate or precise tasks with high realism and control. Moreover, the Torque Control Personalized mode may correspond to a conventional operational mode in which the controller 1102 may monitor joint positions and computes and apply one or more torque commands to achieve the desired torque from the first output plate 410 and the second output plate 418 to facilitate a desired movement or trajectory. By utilizing kinematic models and dynamic properties of the robotic system, this mode may enable accurate control over joint articulation, limb positioning, and end-effector trajectories in both automated and teleoperated robotic operations.

In the speed matching personalized mode, the controller 1102 may be configured to determine the speed of the first torque generator 404 and the second torque generator 412 and may regulate speed in such a manner that sliding friction may be consistent from the first frictional interface 408 and the second frictional interface 416. For example, within the torque generation mechanism, the first torque generator 404 and the second torque generator 412 operate at angular speeds of V+D and V−D, respectively, where V is an angular speed, and D is an offset speed. This means each of the first torque generator 404 and the second torque generator 412 runs slightly faster or slightly slower than the arm's output speed. When observed externally, the first torque generator 404 and the second torque generator 412 may appear to be in co-rotation or both moving in the same direction. However, when observed from the rotating reference frame of the arm itself, the first torque generator 404 and the second torque generator 412 are in counter-rotation, effectively moving in opposite directions relative to an observer rotating with the arm. The controller 1102 dynamically tracks V in real-time and continuously adjusts the offset speed D, accelerating or decelerating the first torque generator 404 and the second torque generator 412 as needed to maintain the desired offset. This ensures that sliding friction is consistently maintained at the first frictional interface 408 and the second frictional interface 416, regardless of how changes in the load affect the speed V, in addition to limiting or minimizing power loss.

In one configuration, the first torque generator 404 and the second torque generator 412 may rotate in the first and second direction, and as explained earlier, the first and second output torque may be generated. However, in case the first frictional interface 408 and the second frictional interface 416 may be in a completely engaged state and the first output torque and the second output torque may be equal and opposite, the net output torque generated by the torque generation system 402 may be zero. In other words, the equal and opposite torque cancel the first output torque by the second output torque, and no net output torque may be generated. Such cases may also be included in zero-torque conditions.

Figure 15:
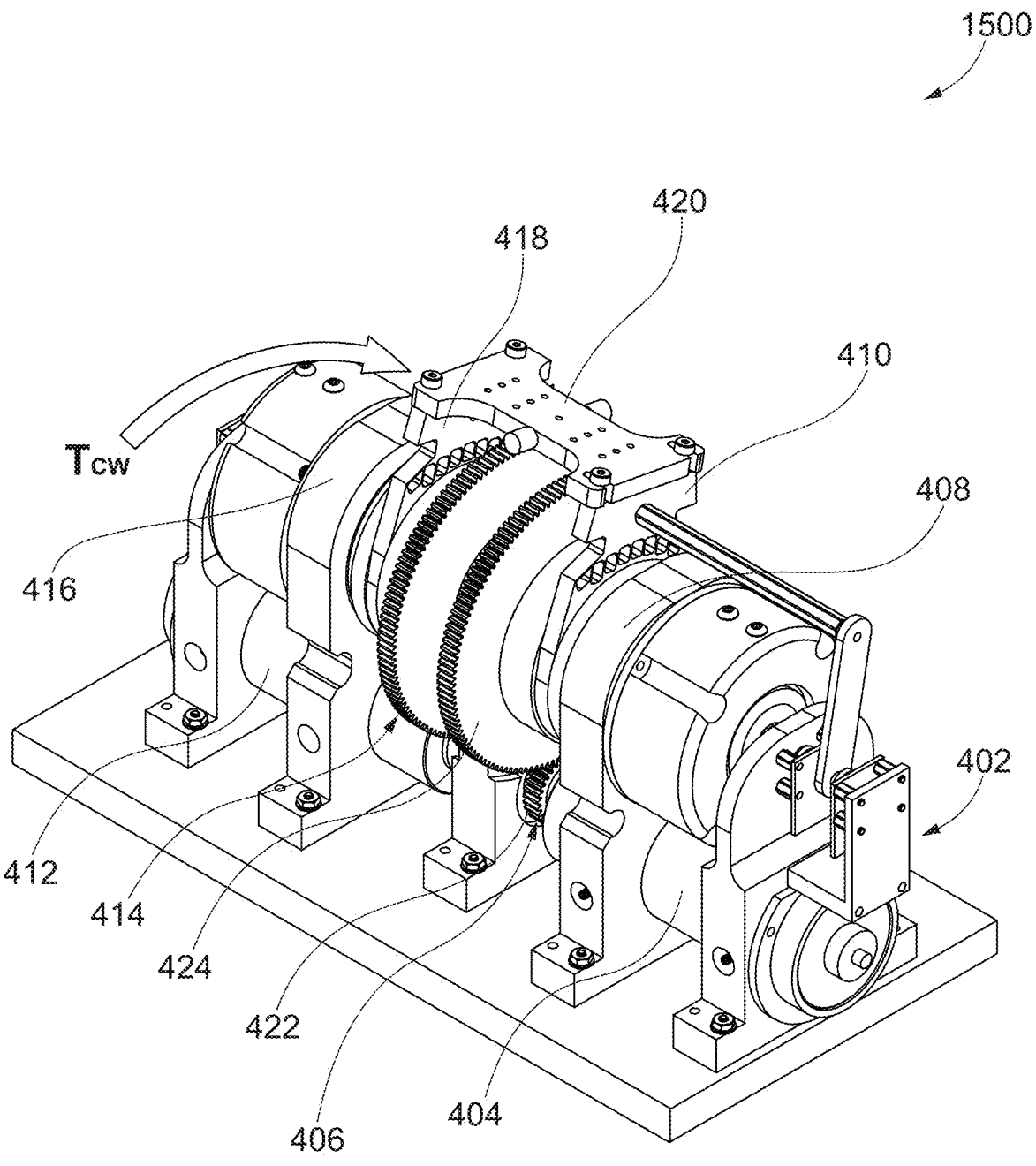
FIG. 15 illustrates a perspective view of the torque generation system.

FIG. 15 illustrates a perspective view 1500 of the torque generation system 402 operating under a selectively disengaged state. As explained herein, the controller 1102 with the selective disengagement module 1206 may selectively disengage any one of the first frictional interface 408 and the second frictional interface 416 by ceasing voltage supply to any one of the first piezoelectric actuator 606 or the second piezoelectric actuator 608. Therefore, either the first output torque or the second output torque may be generated. The selectively disengaged state may be utilized for conventional actuation personalized mode. In the conventional actuation personalized mode, precise angular position control may be enabled by either the first torque generator 404 or the second torque generator 412. Such personalized mode ensures stable and predictable joint positioning in robotic applications that require standard motor-driven actuation.

The controller 1102 with the power controller 1114 may cease any electrical supply to the first piezoelectric actuator 606, the second piezoelectric actuator 608, the first torque generator 404 and the second torque generator 412 to attain the shutdown state. The shutdown state may be utilized for Emergency Shutdown personalized mode which serves as a fail-safe mechanism. In the emergency shutdown personalized mode, the first piezoelectric actuator 606, the second piezoelectric actuator 608 may not be actuated, and residual electric charges therein may be dissipated using a resistor (not shown) thus preventing unintended torque transmission. Alternatively, the power controller 1114 may be configured to operate the first torque generator 404 and the second torque generator 412 passively, or in the passive braking mode or the shutdown mode to cease operation of the torque generation system 402. Hence, this personalized mode ensures system safety in critical failure scenarios.

FIG. 16 illustrates a flow chart 1600 of a torque generation method. At step 1602, a first torque generator 404 may be provided. The first torque generator 404 may include but is not limited to electric motors, harmonic drives, pneumatic or hydraulic actuators, direct drive motors, and the like. At step 1604, a first transmission mechanism 406 may be provided. The first transmission mechanism 406 may include a first driving gear 422 and a first driven gear 424. The first driving gear 422 may be coupled to a first output shaft 506 of the first torque generator 404.

At step 1606, a first frictional interface may be provided. The first frictional interface 408 may be engaged to the first transmission mechanism 406. Further, the first frictional interface 408 may be engaged to the first driven gear 424. The first frictional interface 408 may include a first multi-plate clutch pack, which may include a first series of metal plates 614 stacked with a first series of dry friction plates 616. Further, the first frictional interface 408 may also be enclosed in a first frictional interface outer bushing 618. The first frictional interface outer bushing 618 may be coupled to the metal plates 614 and the dry friction plates 616 with a first output fastener 620.

At step 1608, a first squeezer plate may be provided. The first squeezer plate 602 may be configurable to adjoin the first frictional interface 408. At step 1610, a first output plate 410 may be provided. The first output plate 410 may be adjoined to the first frictional interface 408. The first frictional interface outer bushing 618 may be adjoined to the first output plate 410.

At step 1612, a first piezoelectric actuator 606 may be provided. The first piezoelectric actuator 606 may include piezoelectric layers linearly stacked together. Further, in response to voltage, the first piezoelectric actuator 606 may be actuated and generate a high force with a short stroke, typically in microns or a few hundred microns. The short stroke may result from an expansion of the piezoelectric layers as per the piezoelectric effect, and such expansion may result in the generation of the high force therefrom.

At step 1614, a controller 1102 may be provided. The controller 1102 may connect to the first torque generator 404 and piezoelectric actuator 606. At step 1616, the first frictional interface 408 may be transitioned between the zero-torque condition and the torque generation condition. In the zero-torque condition, the first squeezer plate 602 may be disengaged or separated from the first frictional interface 408 by the first preload distributor 610. Therefore, the first series of metal plates 614 may be separated from the first series of dry friction plates 616, and the second series of metal plates 622 may be separated from the second series of dry friction plates 624. As a result, the first torque from the first torque generator 404 may not be transmitted to the first output plate 410, and the second torque from the second torque generator 412 may not be transmitted to the second output plate 418. In such cases, no output torque may be generated.

In the torque generation condition, the first piezoelectric actuator 606 and the second piezoelectric actuator 608 may be actuated based on the voltage received from the electric power source. In response to the voltage, the first piezoelectric actuator 606 and the second piezoelectric actuator 608 may be configured to apply the first actuation force on the first squeezer plate 602. Further, the first squeezer plate 602 may be configured to apply the first force on the first frictional interface 408. Therefore, the first series of metal plates 614 may engage with the first series of the dry friction plates 616. Accordingly, the first input torque generated by the first torque generator 404 may be transmitted to the first output plate 410. The first output plate 410 may be configured to generate a first output torque with the first input torque.

In an alternative configuration, utilizing the dry friction, force may be obtained. For example, similar to the torque generation system 402, a force generation system may be configured to generate an output force from linear force sources operating on linear driving members such as belt drives (linear belt drives, V-belts), wires, cables, shafts, and the like. As such, the linear driving members may operate in opposite directions, i.e., a first driving member may operate in a first direction and a second driving member may operate in a second direction. Further, the second direction may be opposite to the first direction. Moreover, the first driving member and the second driving member may be connected to the output bars and may pass through a single carriage. The carriage may include frictional interfaces with modulatable friction, such as friction pads and piezoelectric actuators. Similar to the mechanism explained above, the piezoelectric actuators may be configured to actuate the frictional interfaces, such that the frictional interfaces may engage the first driving member and the second driving member to generate an output force, as desired.

The methods, systems, devices, graphs, and/or tables are illustrative examples, and configurations may omit, substitute, or add various procedures or components as appropriate. For instance, the methods may be reordered in alternative configurations, and/or various stages may be added, omitted, and/or combined. Alternatively, features described with respect to certain configurations may be in various alternative configurations. Different aspects and elements of the configurations may be combined similarly. Also, technology evolves; thus, many elements are examples and do not limit the scope of the disclosure or claims. Additionally, the techniques discussed herein may provide differing results with different context awareness classifiers.

Unless defined otherwise, all technical and scientific terms used herein have the same meaning as commonly or conventionally understood. As used herein, the articles "a" and "an" refer to one or more than one (i.e., to at least one) of the grammatical object of the article. By way of example, "an element" means one element or more than one element. "About" and/or "approximately" as used herein when referring to a measurable value such as an amount, a temporal duration, and the like encompass variations of ±20% or ±10%, ±5%, or ±0.1% from the specified value as such variations are appropriate in the context of the systems, devices, circuits, methods, and other implementations described herein. "Substantially," as used herein when referring to a measurable value such as an amount, a temporal duration, a physical attribute (such as frequency), and the like, also encompasses variations of ±20% or ±10%, ±5%, or ±0.1% from the specified value as such variations are appropriate in the context of the systems, devices, circuits, methods, and other implementations described herein.

As used herein, including in the claims, "and" as used in a list of items prefaced by "at least one of" or "one or more of" indicates that any combination of the listed items may be utilized. For example, a list of "at least one of A, B, and C" includes any of the combinations A, B, C, AB, AC, BC, and/or ABC (i.e., A, B, and C). Furthermore, to the extent more than one occurrence or use of the items A, B, or C is possible, multiple uses of A, B, and/or C may form part of the contemplated combinations. For example, a list of "at least one of A, B, and C" may include AA, AAB, AAA, BB, etc.

While illustrative and presently preferred embodiments of the disclosed systems, methods, and/or machine-readable media have been described in detail herein, it is to be understood that the inventive concepts may be otherwise variously embodied and employed and that the appended claims are intended to be construed to include such variations except as limited by the prior art. While the principles of the disclosure have been provided in connection with specific apparatuses and methods, it is to be clearly understood that this description is made only by way of example and not as a limitation on the scope of the disclosure.

What is claimed is:

1. A torque generation system to generate torque from one or more input torques, the torque generation system comprising:

a first torque generator;

a first transmission mechanism coupled to the first torque generator;

a first frictional interface engaged to the first transmission mechanism, the first frictional interface comprising a first multi-plate clutch pack including a first series of metal plates stacked in alternating arrangement with a first series of dry friction plates;

a first squeezer plate configured to adjoin the first frictional interface;

a first output plate adjoined to the first frictional interface;

a first piezoelectric actuator coupled to the first squeezer plate;

a first preload distributor disposed between the first squeezer plate and the first frictional interface;

a second torque generator;

a second transmission mechanism coupled to the second torque generator;

a second frictional interface engaged to the second transmission mechanism, the second frictional interface comprising a second multi-plate clutch pack including a second series of metal plates stacked in alternating arrangement with a second series of dry friction plates;

a second squeezer plate adjoined to the second frictional interface;

a second output plate adjoined to the second frictional interface;

a link connecting the first output plate and the second output plate;

a second piezoelectric actuator coupled to the second squeezer plate;

a second preload distributor disposed between the second squeezer plate and the second frictional interface;

a controller communicably coupled to the first torque generator, the second torque generator, the first piezoelectric actuator, and the second piezoelectric actuator;

a zero-torque condition, wherein:

the first squeezer plate is disengaged from the first frictional interface, the first preload distributor engaging the first squeezer plate to distribute a preload along the first piezoelectric actuator, thereby separating the first series of metal plates from the first series of dry friction plates; and the second squeezer plate is disengaged from the second frictional interface, the second preload distributor engaging the second squeezer plate to distribute a preload along the second piezoelectric actuator, thereby separating the second series of metal plates from the second series of dry friction plates; and a torque generation condition, wherein:

the controller transmits an engagement signal to the first piezoelectric actuator and to the second piezoelectric actuator;

in response to the engagement signal, the first piezoelectric actuator is actuated to apply a first force on the first squeezer plate;

in response to the first force, the first squeezer plate engages the first frictional interface to compress the first series of metal plates against the first series of dry friction plates;

the first squeezer plate engages the first frictional interface;

the first torque generator generates a first input torque in a first torque direction; and the first input torque is transmitted to the first output plate as a first output torque via the first frictional interface;

the second piezoelectric actuator is actuated to apply a second force on the second squeezer plate;

in response to the second force, the second squeezer plate engages the second frictional interface to compress the second series of metal plates against the second series of dry friction plates;

the second torque generator generates a second input torque in a second torque direction, wherein the second torque direction is opposite to the first torque direction;

the second input torque is transmitted to the second output plate as a second output torque via the second frictional interface; and the first output plate and the second output plate collectively generate an output torque with the first output torque and the second output torque.

2. The torque generation system of claim 1, wherein the second squeezer plate is engaged to the second frictional interface in any one of:

a partially engaged state; and a completely engaged state.

3. The torque generation system of claim 2, wherein:

in the partially engaged state:

the second piezoelectric actuator is actuated to partially adjoin the second squeezer plate to the second frictional interface to partially compress the second series of metal plates against the second series of dry friction plates; and in the completely engaged state:

the second piezoelectric actuator is actuated to completely adjoin the second squeezer plate to the second frictional interface to fully compress the second series of metal plates against the second series of dry friction plates.

4. The torque generation system of claim 1, wherein:

the controller generates an operational signal to the second torque generator; and in response to the operational signal, the second torque generator is operated in at least one operation mode, the at least one operation mode comprising at least one of:

an operating mode;

a passive braking mode; and a shutdown mode.

5. The torque generation system of claim 1, wherein the first squeezer plate is engaged to the first frictional interface in any one of:

a partially engaged state; and a completely engaged state.

6. The torque generation system of claim 5, wherein:

in the partially engaged state:

the first piezoelectric actuator is actuated to partially adjoin the first squeezer plate to the first frictional interface to partially compress the first series of metal plates against the first series of dry friction plates; and in the completely engaged state:

the first piezoelectric actuator is actuated to completely adjoin the first squeezer plate to the first frictional interface to fully compress the first series of metal plates against the first series of dry friction plates.

7. The torque generation system of claim 1, wherein:

the controller generates an operational signal to the first torque generator; and in response to the operational signal, the first torque generator is operated in at least one operation mode, the at least one operation mode comprising at least one of:

an operating mode;

a passive braking mode; and a shutdown mode.

8. A torque generation method for generating torque from one or more input torques, the torque generation method comprising:

providing a first torque generator;

providing a first transmission mechanism coupled to the first torque generator;

providing a first frictional interface engaged to the first transmission mechanism, the first frictional interface comprising a first multi-plate clutch pack including a first series of metal plates stacked in alternating arrangement with a first series of dry friction plates;

providing a first squeezer plate configured to adjoin the first frictional interface;

providing a first output plate adjoined to the first frictional interface;

providing a first piezoelectric actuator coupled to the first squeezer plate;

providing a first preload distributor disposed between the first squeezer plate and the first frictional interface;

providing a first preload distributor disposed between the first squeezer plate and the first frictional interface;

providing a second torque generator;

providing a second transmission mechanism coupled to the second torque generator;

providing a second frictional interface engaged to the second transmission mechanism, the second frictional interface comprising a second multi-plate clutch pack including a second series of metal plates stacked in alternating arrangement with a second series of dry friction plates;

providing a second squeezer plate adjoined to the second frictional interface;

providing a second output plate adjoined to the second frictional interface;

providing a link connecting the first output plate and the second output plate;

providing a second piezoelectric actuator coupled to the second squeezer plate;

providing a second preload distributor disposed between the second squeezer plate and the second frictional interface;

providing a second preload distributor disposed between the second squeezer plate and the second frictional interface; and providing a controller communicably coupled to the first torque generator, the second torque generator, the first piezoelectric actuator, and the second piezoelectric actuator; and transitioning the first frictional interface between:
- a zero-torque condition, comprising:
  - disengaging the first squeezer plate from the first frictional interface; and
  - disengaging the second squeezer plate from the second frictional interface, wherein the first preload distributor engages the first squeezer plate to distribute a preload along the first piezoelectric actuator, thereby disengaging the first squeezer plate from the first frictional interface, and the second preload distributor engages the second squeezer plate to distribute a preload along the second piezoelectric actuator, thereby disengaging the second squeezer plate from the second frictional interface;
- a torque generation condition, comprising:
  - generating by the controller, an engagement signal to the first piezoelectric actuator;
  - in response to the engagement signal,
  - actuating the first piezoelectric actuator for applying a first force on the first squeezer plate;
  - in response to the first force,
  - engaging the first squeezer plate with the first frictional interface;
  - generating with the first torque generator, a first input torque in a first torque direction;
  - transmitting the first input torque to the first output plate as a first output torque via the first frictional interface; and
- the torque generation condition comprising:
  - generating by the controller, an engagement signal to the second piezoelectric actuator;
  - in response to the engagement signal,
  - the second piezoelectric actuator is actuated to apply a second force on the second squeezer plate,
  - in response to the second force,
  - the second squeezer plate engages the second frictional interface;
  - generating by the second torque generator, a second input torque in a second torque direction,
  - wherein the second torque direction is any one of:
    - opposite to the first torque direction; or
    - equivalent to the first torque direction;
  - transmitting the second input torque to the second output plate as a second output torque via the second frictional interface; and
  - collectively generating with the first output plate and the second output plate, an output torque with the first input torque and the second input torque.

9. The torque generation method of claim 8, wherein engaging the second squeezer plate with the second frictional interface further comprises:
- engaging the second squeezer plate with the second frictional interface in any one of:
  - a partially engaged state; and
  - a completely engaged state.

10. The torque generation method of claim 9, wherein engaging the second squeezer plate with the second frictional interface further comprises:
- in the partially engaged state:
  - the second piezoelectric actuator is actuated to partially adjoin the second squeezer plate to the second frictional interface; and
- in the completely engaged state:
  - the first piezoelectric actuator is actuated to completely adjoin the second squeezer plate to the second frictional interface.

11. The torque generation method of claim 8 and further comprising:
- generating by the controller, an operational signal to the second torque generator; and
- in response to the operational signal, the second torque generator is operated in at least one operation mode, the at least one operation mode comprising at least one of:
  - an operating mode;
  - a passive braking mode; and
  - a shutdown mode.

12. The torque generation method of claim 8, wherein engaging the first squeezer plate with the first frictional interface further comprises:
- engaging the first squeezer plate with the first frictional interface in any one of:
  - a partially engaged state; and
  - a completely engaged state.

13. The torque generation method of claim 12, wherein engaging the first squeezer plate with the first frictional interface further comprises:
- in the partially engaged state:
  - the first piezoelectric actuator is actuated to partially adjoin the first squeezer plate to the first frictional interface; and
- in the completely engaged state:
  - the first piezoelectric actuator is actuated to completely adjoin the first squeezer plate to the first frictional interface.

14. The torque generation method of claim 8 and further comprising:
- generating by the controller, an operational signal to the first torque generator; and
- in response to the operational signal, the first torque generator is operated in at least one operation mode, the at least one operation mode comprising at least one of:
  - an operating mode;
  - a passive braking mode; and
  - a shutdown mode.

15. A torque generation system to generate torque from one or more input torques, the torque generation system comprising:
- a first torque generator;
- a first transmission mechanism coupled to the first torque generator;
- a first frictional interface engaged to the first transmission mechanism, the first frictional interface comprising a first multi-plate clutch pack including a first series of metal plates stacked in alternating arrangement with a first series of dry friction plates;

a first squeezer plate configured to adjoin the first frictional interface;

a first output plate adjoined to the first frictional interface;

a first piezoelectric actuator coupled to the first squeezer plate;

a first preload distributor disposed between the first squeezer plate and the first frictional interface;

a second torque generator;

a second transmission mechanism coupled to the second torque generator;

a second frictional interface engaged to the second transmission mechanism, the second frictional interface comprising a second multi-plate clutch pack including a second series of metal plates stacked in alternating arrangement with a second series of dry friction plates;

a second squeezer plate adjoined to the second frictional interface;

a second output plate adjoined to the second frictional interface;

a link connecting the first output plate and the second output plate;

a second piezoelectric actuator coupled to the second squeezer plate;

a second preload distributor disposed between the second squeezer plate and the second frictional interface;

a controller communicably coupled to the first torque generator and the first piezoelectric actuator;

a partially engaged state, wherein:

the controller transmits a partial engagement signal to the first piezoelectric actuator and to the second piezoelectric actuator;

in response to the partial engagement signal, the first piezoelectric actuator is actuated to partially adjoin the first squeezer plate to the first frictional interface to partially compress the first series of metal plates against the first series of dry friction plates;

the first torque generator generates a first input torque in the first torque direction;

the first input torque is transmitted to the first output plate as a first output torque via the first frictional interface;

the second piezoelectric actuator is actuated to partially adjoin the second squeezer plate to the second frictional interface;

the second torque generator generates a second input torque in a second torque direction; and the second input torque is transmitted to the second output plate as a second output torque via the second frictional interface; and a completely engaged state, wherein:

the controller transmits a complete engagement signal to the first piezoelectric actuator;

in response to the complete engagement signal, the first piezoelectric actuator is actuated to completely adjoin the first squeezer plate to the first frictional interface to fully compress the first series of metal plates against the first series of dry friction plates;

the first torque generator generates a first input torque in a first torque direction; and the first input torque is transmitted to a first output plate as the first output torque via the first frictional interface;

the second piezoelectric actuator is actuated to completely adjoin the second squeezer plate to the second frictional interface to fully compress the second series of metal plates against the second series of dry friction plates;

the second torque generator generates a second input torque in a second torque direction;

the second input torque is transmitted to the second output plate as a second output torque via the second frictional interface; and the first output plate and the second output plate collectively generate an output torque with the first output torque and the second output torque.

16. The torque generation system of claim 15, wherein the first piezoelectric actuator is actuated to adjoin partially, or completely, to the first squeezer plate to the first frictional interface to compress the first series of metal plates against the first series of dry friction plates in accordance with one or more real time personalized modes.

17. The torque generation system of claim 15, wherein the second piezoelectric actuator is actuated to adjoin partially, or completely to the second squeezer plate to the second frictional interface to compress the second series of metal plates against the second series of dry friction plates in accordance with one or more real time personalized mode.

* * * * *